US011266124B2

(12) United States Patent
Tanner

(10) Patent No.: US 11,266,124 B2
(45) Date of Patent: Mar. 8, 2022

(54) ANIMAL WASTE COLLECTION AND STORAGE SYSTEM

(71) Applicant: Trae Tanner, Calgary (CA)

(72) Inventor: Trae Tanner, Calgary (CA)

(*) Notice: Subject to any disclaimer, the term of this patent is extended or adjusted under 35 U.S.C. 154(b) by 199 days.

(21) Appl. No.: 16/792,859

(22) Filed: Feb. 17, 2020

(65) Prior Publication Data
US 2020/0267940 A1 Aug. 27, 2020

Related U.S. Application Data

(63) Continuation-in-part of application No. 16/281,361, filed on Feb. 21, 2019.

(51) Int. Cl.
*A01K 27/00* (2006.01)
(52) U.S. Cl.
CPC .......... *A01K 27/008* (2013.01); *A01K 27/004* (2013.01)
(58) Field of Classification Search
CPC .. A01K 27/008; A01K 27/004; A01K 27/003; A01K 27/00
See application file for complete search history.

(56) References Cited

U.S. PATENT DOCUMENTS

| D392,429 S | 3/1998 | Plewa et al. | |
|---|---|---|---|
| 5,890,456 A * | 4/1999 | Tancrede | A01K 27/004 |
| | | | 119/794 |
| 6,240,881 B1 * | 6/2001 | Edwards | A01K 27/004 |
| | | | 119/795 |
| D610,752 S | 2/2010 | Roediger | |
| 7,789,042 B1 * | 9/2010 | Dinon | A01K 7/00 |
| | | | 119/61.5 |
| 8,061,305 B2 * | 11/2011 | Sugalski | A01K 27/006 |
| | | | 119/795 |
| D651,768 S | 1/2012 | Bogdahn | |
| 8,256,379 B2 | 9/2012 | Rabello | |
| 8,720,385 B2 | 5/2014 | Tanner | |
| D711,054 S | 8/2014 | Schmidt | |
| D725,845 S | 3/2015 | Goldy et al. | |
| 9,232,772 B1 | 1/2016 | Majcen et al. | |
| D762,018 S | 7/2016 | Schmidt | |

(Continued)

FOREIGN PATENT DOCUMENTS

| CA | 2323174 A1 | 4/2002 |
|---|---|---|
| CA | 2344330 A1 | 1/2007 |
| WO | 2010135821 A1 | 12/2010 |

OTHER PUBLICATIONS

Trae Tanner, Animal Waste Collection and Storage System, U.S. Appl. No. 16/281,361, filed Feb. 21, 2019.

*Primary Examiner* — Kristen C Hayes
(74) *Attorney, Agent, or Firm* — David Guerra

(57) ABSTRACT

An animal leash system combined with a storage container and a bag storing container. The system includes a housing that encloses a leash retracting mechanism configure to control movement of a leash extending thereout. The bag container includes an open end configured to receive a bag container cap or an end of a ball thrower device. The storage container includes a container cap defining a recess configured to threadably receive a threaded post of the bag container cap. The system provides a single unit that includes the advantages of a retractable pet leash with the convenience of having bags ready for use to collect pet waste along with a storage container for disposing of waste filled bags.

20 Claims, 15 Drawing Sheets

(56) References Cited

U.S. PATENT DOCUMENTS

| | | |
|---|---|---|
| 2003/0154931 A1 | 8/2003 | Ostrowiecki |
| 2006/0219182 A1* | 10/2006 | Rabello ............... A01K 27/008 |
| | | 119/61.56 |
| 2006/0231043 A1 | 10/2006 | Galdo |
| 2007/0204805 A1 | 9/2007 | Brody |
| 2008/0276883 A1 | 11/2008 | Perez Tomas |
| 2010/0300375 A1 | 12/2010 | Tang |
| 2012/0137978 A1 | 6/2012 | McBounds |
| 2012/0186539 A1* | 7/2012 | Johnston ............. A01K 27/008 |
| | | 119/796 |
| 2013/0098308 A1* | 4/2013 | Tanner ................ A01K 27/004 |
| | | 119/707 |
| 2014/0131377 A1 | 5/2014 | Rogers |
| 2016/0219838 A1 | 8/2016 | Flaig |
| 2017/0071163 A1* | 3/2017 | Glasser ................... A01K 7/00 |

\* cited by examiner

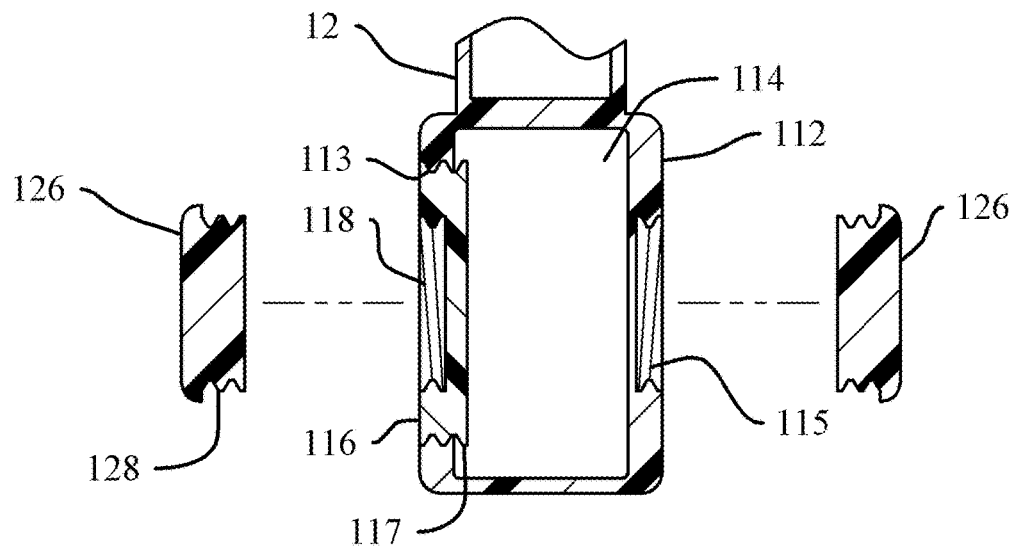
FIG. 16
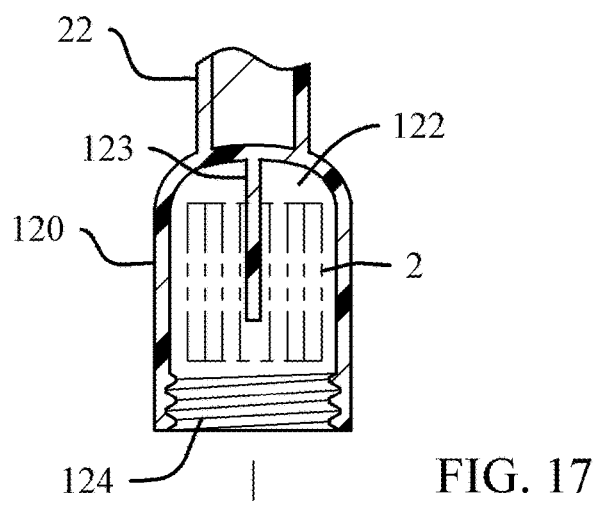
FIG. 17
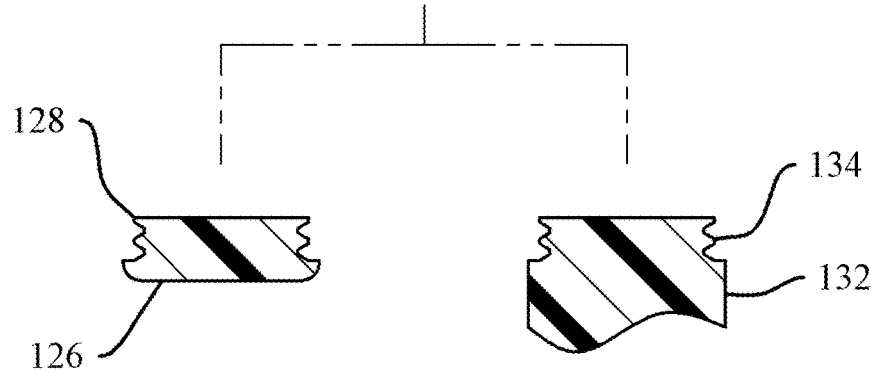

ANIMAL WASTE COLLECTION AND STORAGE SYSTEM

CROSS-REFERENCE TO RELATED APPLICATION

This application is a continuation-in-part under 35 U.S.C. § 120 based upon co-pending U.S. patent application Ser. No. 16/281,361 filed on Feb. 21, 2019, which is incorporated herein by reference in its entirety.

BACKGROUND

Technical Field

The present technology relates to an animal waste collection and storage system for use in connection with collecting and storing animal waste. More particularly, it relates to a retractable animal leash device in combination with a bag dispenser and removable storage container.

Background Description

There have long been leashes for controlling and holding pets during walks or for tether pets to an object. Devices for restraining, controlling and limiting the distance a pet or animal can wander from a tethered point or person are well known in the art. Typically these devices are have one a single purpose, that is to restrain or control the animal. One problem associated with such devices is that leashes occupy at least one hand of a user so that other items, which can be useful or necessary to the user, cannot easily be carried. Pet paraphernalia items, such as a ball thrower, waste bag dispenser and/or storage container, may therefore be left behind. Therefore, it is while one is walking a pet that certain items are apt to be most urgently needed and yet not at hand.

Pet owners take their pets out for walks and out to parks. It is common that when out in public, the animal may defecate and it is the accompanying person's responsible to collect and dispose of any excrement. It is further noted that some municipalities have by-laws that require the person accompanying the animal to collect and properly dispose of any excrement. Failure to comply with these by-laws could result in a ticket or fine. Thus, many pet owners are compelled by law and/or a sense of personal responsibility to collect and dispose of waste deposited in public spaces by their pets.

Picking up pet waste is a burdensome and possibly toxic task, where the pet owner must bring a bag along with them and then carry a waste filled bag. The process of collecting pet waste is typically conducted manually, which involves placing a hand inside a bag, using the bag-covered hand to grasp the waste, and rolling the bag over to enclose the waste. After the waste is collected in the bag, the pet owner must then locate an appropriate trash bin for proper disposal of the waste. During this time, the pet owner is required to carry the bag containing the pet waste, in which the bag may rupture thereby leaking pet waste over the pet owner, the pet, the ground or in a vehicle.

Additionally, pet owners like to throw balls for the pet to run after, retrieve, and play with, thereby providing exercise to the pet. Many pet owners like to use retractable leashes to vary the distance the dog can roam depending on their surroundings, and they like to use ball throwers to throw the ball long distances without straining their arms by repeatedly throwing the ball. A retractable pet leash in one hand and a ball thrower in the other results with no free hand, hence the need for a combination pet leash with combined functions.

There are other leash devices designed for tethering pets. While these leash devices may be suitable for the purposes for which they were designed, they would not be as suitable for the purposes of the present technology as heretofore described.

It is thus desirable to provide a device incorporating a retractable leash, a waste bag dispenser, a removable disposable bag storage container, and an attachable ball thrower.

Therefore, a need exists for a new and novel animal waste collection and storage system that can be used for collecting and storing animal waste. In this regard, the present technology substantially fulfills this need. In this respect, the animal waste collection and storage system according to the present technology substantially departs from the conventional concepts and designs of the prior art, and in doing so provides an apparatus primarily developed for the purpose of collecting and storing animal waste.

BRIEF SUMMARY OF THE PRESENT TECHNOLOGY

In view of the foregoing disadvantages inherent in the known types of pet leash systems now present in the prior art, the present technology provides a novel animal waste collection and storage system, and overcomes the above-mentioned disadvantages and drawbacks of the prior art. As such, the general purpose of the present technology, which will be described subsequently in greater detail, is to provide a new and novel animal waste collection and storage system and method which has all the advantages of the prior art mentioned heretofore and many novel features that result in an animal waste collection and storage system which is not anticipated, rendered obvious, suggested, or even implied by the prior art, either alone or in any combination thereof.

According to one aspect, the present technology can include a retractable leash system comprising a housing, a first container and a second container. The housing can include a leash retracting mechanism configure to provide retraction of a leash extending out of the housing. The first container can define a first container internal cavity and a first container open end, and can include a first container cap securable to the first container open end. The second container can define a second container internal cavity and a second container open end, and can include a second container cap configured to be engageable to the second container open end in an in-use position and to the first container cap in a storage position, the second container internal.

According to another aspect, the present technology can include a retractable leash system comprising a housing, a first container, a first container cap and a first container end cap. The housing can include a leash retracting mechanism configured to provide retraction of a leash extending out of the housing. The first container can define a bore therethrough. The first container cap can define a first container internal cavity, and can include a first container open end in communication with the first container internal cavity, and a flanged closed end. The first container open end can be receivable in a first end of the bore. The first container end cap can include a first end and a flanged second end. The first end can be receivable through a second end of the bore and in the first container open end of the first container cap.

According to another aspect, the present technology can include a retractable leash system comprising a housing, a first container, a first container cap, a first container end cap, a second container, a second container cap, a third container and a ball thrower. The housing can include a leash retracting mechanism configured to provide retraction of a leash extending out of the housing. The storage container can define a bore therethrough. The first container cap can define a first container cap internal cavity, and can include a first container cap open end in communication with the first container cap internal cavity, and a flanged closed end. The first container cap open end can be receivable in a first end of the bore. The first container end cap can include a first end and a flanged second end. The first end can be receivable through a second end of the bore and receivable in the first container cap open end. The second container can define a second container internal cavity and a second container open end. The second container cap can be configured to be securable to the second container open end in an in-use position and securable to a recess defined in the first container cap or the first container end cap when in a stored position. The third container can define a third container internal cavity and a third container open end, and can include a third container cap securable to the third container open end. The ball thrower can include a first end and a ball receiving end. The first end of the ball thrower can be securable to the second container open end when the second container cap is removed from the second container open end.

According to another aspect, the present technology can include a retractable leash system comprising a housing including a leash retracting mechanism configure to provide retraction of a leash extending out of the housing. A storage container defining an internal cavity and an open end. The storage container can include a container cap securable to with the open end of the storage container. A bag container defining a bag container internal cavity and a bag container open end. The bag container can include a bag container cap configured to be securable to the bag container open end and a recess defined in the container cap. The bag container internal cavity can be configured to store at least one bag or bag roll therein and configured to allow removal of the bag or a bag from the bag roll from the bag container.

According to even another aspect, the present technology can include a retractable leash system comprising a housing including a leash retracting mechanism configure to provide retraction of a leash extending out of the housing. A storage container defining an internal cavity and an open end. The storage container can include a container cap securable to with the open end of the storage container. A bag container defining a bag container internal cavity and a bag container open end. The bag container can include a bag container cap configured to be securable to the bag container open end and a recess defined in the container cap. The bag container internal cavity can be configured to store at least one bag or bag roll therein and configured to allow removal of the bag or a bag from the bag roll from the bag container. A ball thrower including a first end and a ball receiving end. The first end of the ball thrower can include threading configured to engage with threading of the bag container open end when the bag container cap is removed from the bag container open end.

According to yet another aspect, the present technology can include a leash system comprising a housing and a storage container. The housing can include a leash retracting mechanism configure to provide a retraction movement of a leash extending out of the housing, and a bag dispensing section. The bag dispensing section can be configured to store at least one bag therein and configured to allow removal of the bag from the bag dispensing section. The storage container can be attachable with the housing between an open position allowing access to an interior of the storage container, and a closed position.

According to still another aspect, the present technology can include a leash system comprising a housing and a storage container. The housing can include a leash retracting mechanism configure to control movement of a leash extending out of the housing, a base transverse with the housing, and a bag dispensing section associated with the base. The bag dispensing section can be configured to store at least one bag therein and configured to allow removal of the bag from the bag dispensing section. The base can include a wall extending outwardly from the base in a direction opposite the housing. The wall can include a paraphernalia receiving section configured to removably receive and retain a part of a paraphernalia item. The storage container can be slidably attachable with the housing between an open position allowing access to an interior of the storage container, and a closed position.

In some embodiments, the first or storage container cap can include a first side and a second side, and wherein the second side can define a recess therein.

In some embodiments, the second or bag container cap can include a post extending from a first side of the second container cap. The post can include threading engageable with threading of the recess.

In some embodiments, the second or bag container can further include a shaft extending into the second container internal cavity. The shaft can be configured to rotatably support a roll of bags.

In some embodiments, the first or storage container internal cavity can be a bore defined through the first or storage container. The first or storage container cap can be cup-shaped defining a first or storage container cap internal cavity. The second side of the first or storage container cap can be a flanged end having a size greater than the first side. The first side can be an open end in communication with the first or storage container cap internal cavity and configured to be receivable in a first end of the bore.

Some embodiments of the present technology can include a first or storage container end cap including a first end and a flanged end. The first end can be configured to be received in a second end of the bore and in the open end of the first or storage container cap. The flanged end can have a size greater than the first end of the first or storage container end cap.

In some embodiments, the flanged end of the first or storage container cap can be associated with a first seal and the flanged end of the first or storage container end cap being associated with a second seal. The first seal can be configured to contact a first side of the first or storage container and the second seal being configured to contact a second side of the first or storage container when the first or storage container cap and the first or storage container end cap are assembled in the bore.

Some embodiments of the present technology can include a ball thrower including a first end and a ball receiving end. The first end of the ball thrower can include threading configured to engage with threading of the second or bag container open end when the second or bag container cap is removed from the second or bag container open end.

Some embodiments of the present technology can include a third container. The third container can define a third container internal cavity and a third container open end, and can include a third container cap securable to the third container open end.

In some embodiments, the first, second, third, storage and/or bag container can be cylindrical.

In some embodiments, a portion of a cylindrical sidewall of the first container and a portion of a cylindrical sidewall of the third container can both be integral with a portion of the housing so that a longitudinal axis of the first container and the third container are parallel.

In some embodiments, a portion of an end wall of the second container can be integral with a second portion of the handle so that a longitudinal axis of the second container is different to the longitudinal axis of the first container and the third container.

In some embodiments, a portion of a cylindrical sidewall of the first or storage container can be integral with a portion of the housing so that a longitudinal axis of the first or storage container is perpendicular to a longitudinal axis of a handle of the housing.

In some embodiments, a portion of an end wall of the second or bag container can be integral with a portion of the handle so that a longitudinal axis of the second or bag container is perpendicular to the longitudinal axis of the storage container.

In some embodiments of the present technology, the housing can include a pair of rails, and the storage container can include a pair of riders configured to slidably engage with the rails, respectively.

In some embodiments, the housing can include a base transverse with the housing, with the bag dispensing section being associated with a first end of the base.

Some embodiments of the present technology can include a door pivotably attached to the base.

In some embodiments, the storage container can include a pair of opposite sidewalls each having a configuration to be flush with an edge of the base when the riders of the storage container are engaged with the rails of the base.

In some embodiments, at least one of the riders can be associated with each of the sidewalls. Each of the riders can define a channel and a guide ledge, and the channel can be configured to slidably receive a flange of the rails, respectively.

In some embodiments, the guide ledge can be interiorly offset in relation to its corresponding sidewalls.

Some embodiments can include the rails associated with opposite edges of the base, respectively.

In some embodiments, the base can have a width greater than a width of the housing.

In some embodiments, the storage container includes a first part of a latch mechanism and the base can include a second part of the latch mechanism. The first part and the second part of the latch mechanism can be engageable with each other when the storage container is in the closed position.

In some embodiments, the storage container can include a pair of retaining sections in a spaced apart relationship configured to receive the bag dispensing section therebetween when the storage container is in the closed position.

Some embodiments can include the retaining sections and the bag dispensing section being removably engageable by way of a post and recess arrangement.

In some embodiments, the housing can include a base with a wall extending outwardly therefrom in a direction opposite the housing. The wall can be configured to be received between the retaining sections when the storage container is in the closed position In some embodiments, the wall can include an object receiving section configured to removably receive and retain a part of a paraphernalia item.

Some embodiments of the present technology can include the object, wherein the paraphernalia item can be a ball thrower, a cane, a tool, an umbrella, a scoop or shovel, a flashlight or an additional pet leash assembly.

In some embodiments, the storage container can include a rear wall featuring an indented region configured to receive at least a portion of the object receiving section of the wall when the storage container is in the closed position.

In some embodiments, the storage container can define a slot configured to receive at least one finger of a hand of a user.

There has thus been outlined, rather broadly, features of the present technology in order that the detailed description thereof that follows may be better understood and in order that the present contribution to the art may be better appreciated.

The present technology may also include (brief description of additional elements and features). There are, of course, additional features of the present technology that will be described hereinafter and which will form the subject matter of the claims attached.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel animal waste collection and storage system that has all of the advantages of the prior art pet leashes and none of the disadvantages.

It is another object of the present technology to provide a new and novel animal waste collection and storage system that may be easily and efficiently manufactured and marketed.

An even further object of the present technology is to provide a new and novel animal waste collection and storage system that has a low cost of manufacture with regard to both materials and labor, and which accordingly is then susceptible of low prices of sale to the consuming public, thereby making such animal waste collection and storage system economically available to the buying public.

Still another object of the present technology is to provide a new animal waste collection and storage system that provides in the apparatuses and methods of the prior art some of the advantages thereof, while simultaneously overcoming some of the disadvantages normally associated therewith.

Even still another object of the present technology is to provide a leash system for dispensing bags, and storing waste filled bags in the storage container. This allows a user of the present technology to collect any pet waste and sanitarily store the waste filled bag for later disposal, without carrying the waste filled bag in the hand or littering the bag.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology.

BRIEF DESCRIPTION OF THE DRAWINGS

The present technology will be better understood and objects other than those set forth above will become apparent when consideration is given to the following detailed description thereof. Such description makes reference to the annexed drawings wherein:

FIG. 16 is a cross-sectional view of the alternate embodiment of the present technology with the container cap assembled to the container and the bag cap exploded in relation to the container cap.

FIG. 17 is a cross-sectional view of the alternate embodiment of the present technology with the bag cap and the peripheral device exploded in relation to the bag container.

The same reference numerals refer to the same parts throughout the various figures.

DETAILED DESCRIPTION OF THE PREFERRED EMBODIMENTS

Figure 1:
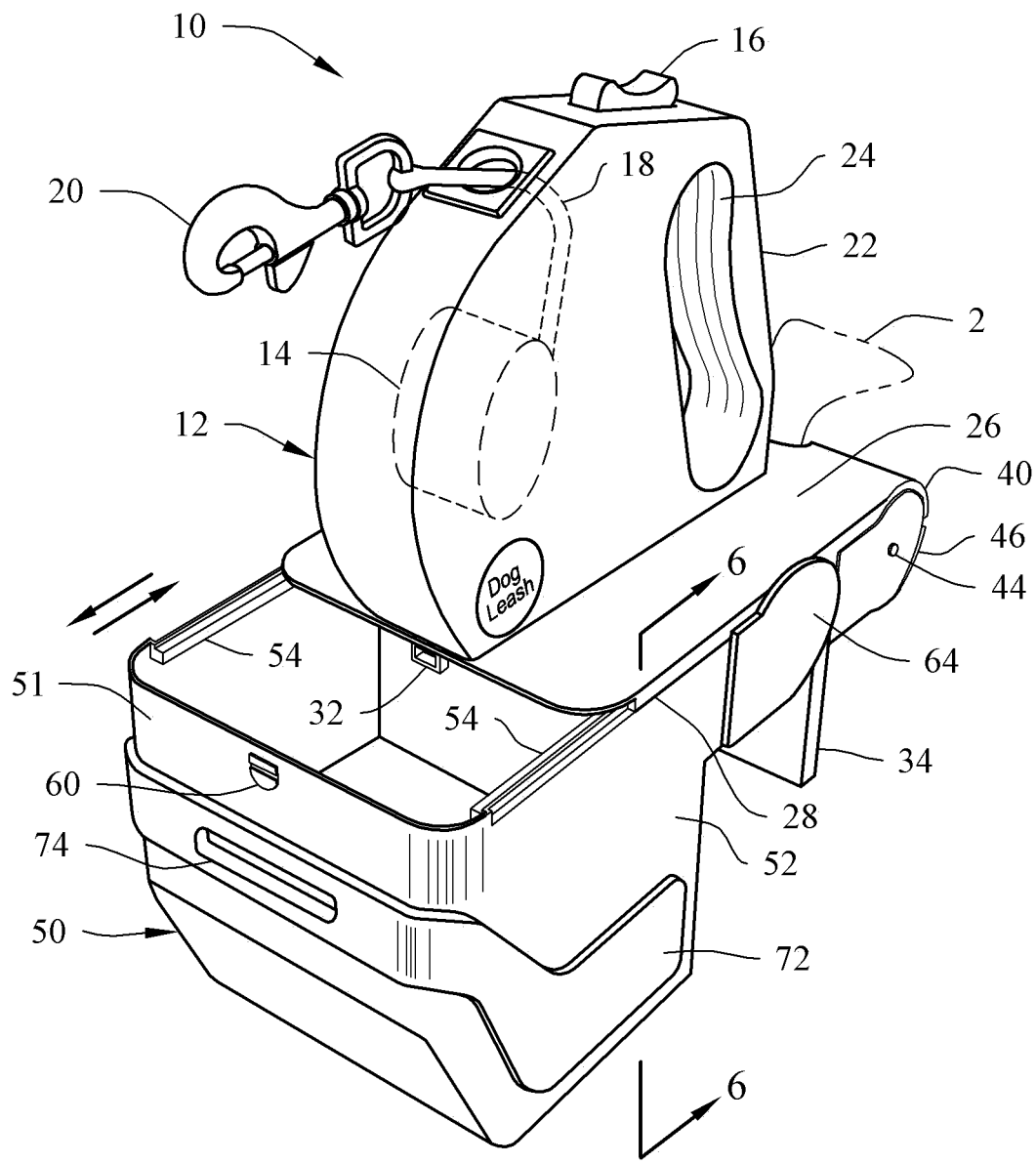
FIG. 1 is a left perspective view of an embodiment of the animal waste collection and storage system constructed in accordance with the principles of the present technology, with the phantom lines depicting environmental structure and forming no part of the claimed present technology.

Referring now to the drawings, and particularly to FIGS. 1-24, an embodiment of the animal waste collection and storage system of the present technology is shown and generally designated by the reference numeral 10.

Figure 2:
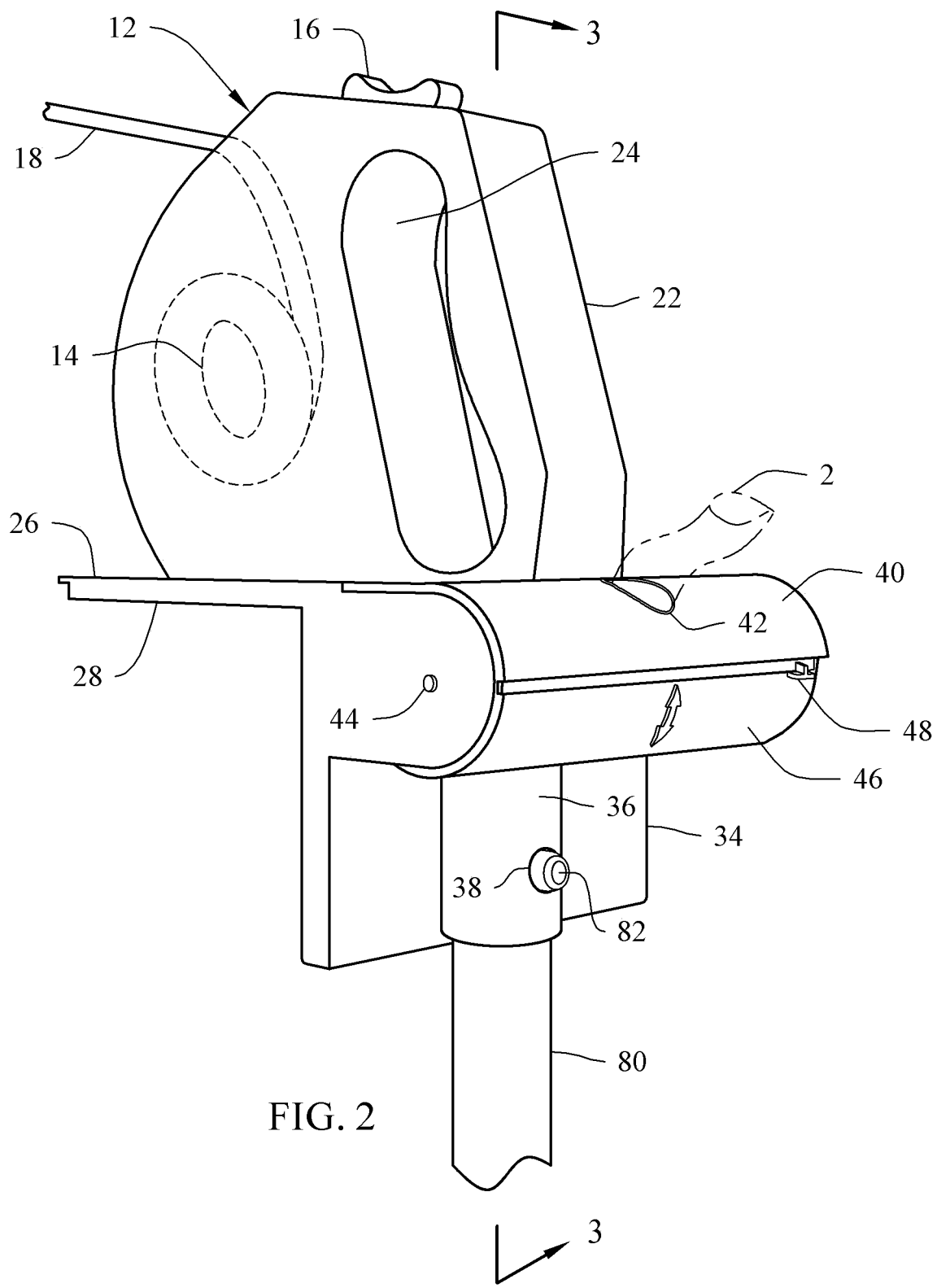
FIG. 2 is a right perspective view of the animal waste collection and storage system of the present technology.
Figure 3:
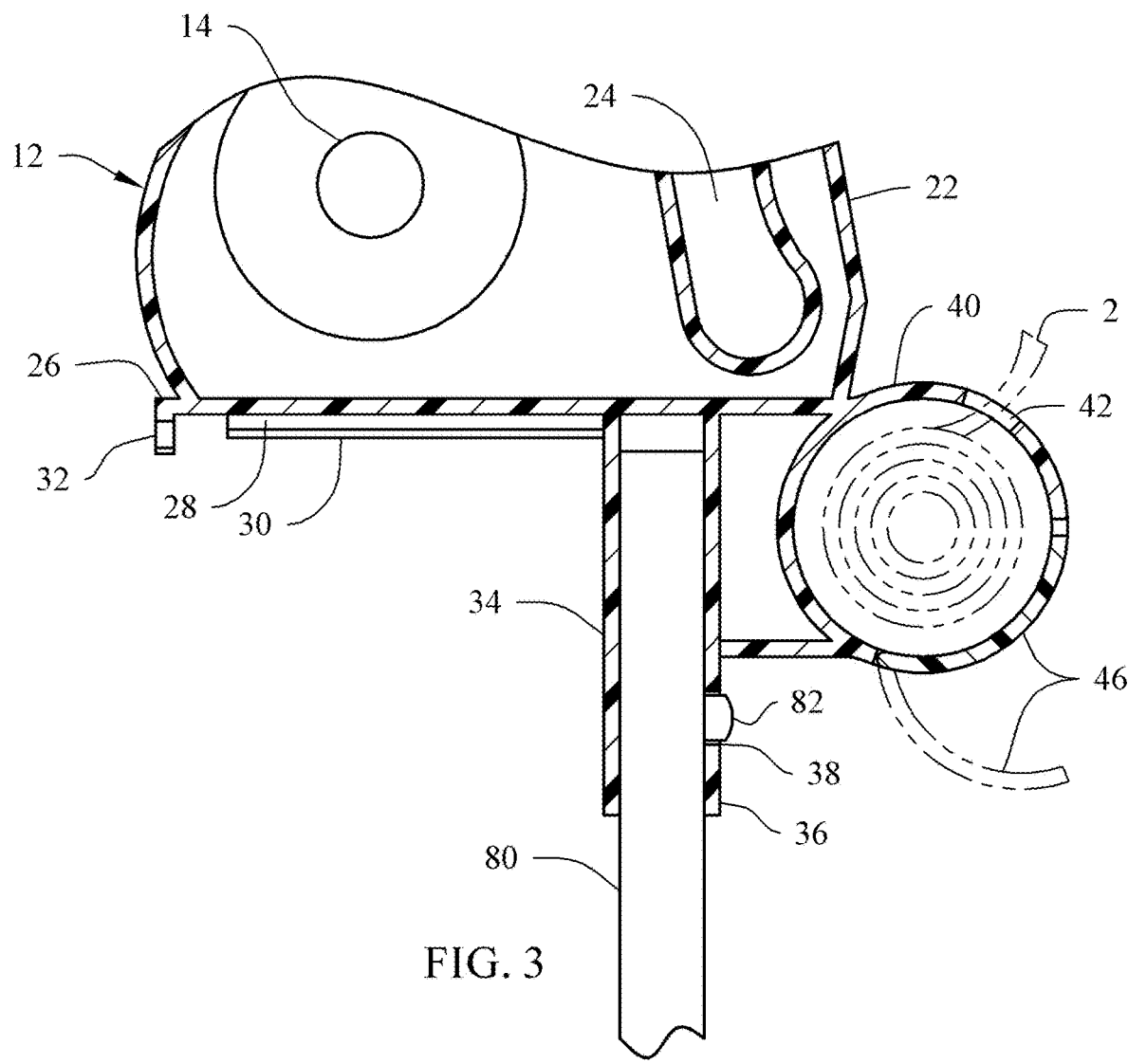
FIG. 3 is a cross-sectional view of the animal waste collection and storage system taken along line 3-3 in FIG. 2.

Referring to FIGS. 1-3, a new and novel animal waste collection and storage system 10 of the present technology for collecting and storing animal waste is illustrated and will be described. More particularly, the animal waste collection and storage system 10 includes a leash housing 12 featuring a bag dispenser or bag dispensing section 40 capable of dispensing a bag 2, a storage container 50 removably attachable to the leash housing 12, and a paraphernalia item 80 removably attachable to the leash housing 12.

The housing 12 has a main body that encloses a leash retracting mechanism 14. A leash activation button 16 is operational through the housing 12 to actuate and control the leash retracting mechanism 14. The housing 12 can be formed from at least two halves joined together to form the housing. The leash retracting mechanism 14 can include, but not limited to, a spring biased ratcheting spool configured to retract a leash, lead or length of cord 18 into the housing 12 and around the spool. When operated by the user, the button 16 prevents the leash retracting mechanism 14 from operating or rotating, and thereby locks the leash retracting mechanism 14 in place. A locking pin can be associated and operably engageable with the button 16, and when activated by the user, locks the button 16 in an operational position, thereby keeping the button 16 engaged with the leash retracting mechanism 14 until the user disengages the locking pin from the button 16. A portion of the button 16 extends out from the housing 12, so as to be operated by the user. The button 16 can include a spring (not shown) so as to force the button to a position that is disengaged from the leash retracting mechanism 14.

In the exemplary, the button 16 can operate a lock-release mechanism that can include includes an element which can be moved up and down. This movement is against the resistance of a spring. The element of the lock-release mechanism can be received in openings, slots or ratchet teeth associated with the leash retracting mechanism 14. While the element is received in one of the ratchet teeth, the leash retracting mechanism 14 is held against rotation.

Releasing pressure on the button 16 or allowing the button to move away from the leash retracting mechanism 14 would result in the element moving out of engagement with the ratchet teeth, thereby allowing the leash retracting mechanism 14 to retract consequently retracting the leash into the housing 12.

It can be appreciated that more than one leash retracting mechanism 14, button 16, and leash 18 can be incorporated into the present technology, thereby allowing the user to walk two or more animals at the same time. It can also be appreciated that a shock absorbing means can be operationally engaged with the leash retracting mechanism 14 or the leash 18, for absorbing a rapid increasing in pulling force or jerk-like force from the animal attached to the leash.

The leash 18 exits the housing 12 through a hole located opposite a handle 22 formed in or attached to the housing 12. It can be appreciated that the hole can have any shape or configuration that allows the leash 18 to pass therethrough. One end of the leash 18 is secured to the spool or the leash retracting mechanism 14 by any suitable means, while the free end is exterior of the housing 12 and includes or is attachable to a clip 20 or a pet collar.

The handle 22 defines an opening 24 configured and ergonomically shaped to receive the users hand and/or fingers therein. The handle 22 and opening 24 may have different shapes and configurations, such as but not limited to, being angled in relation to the longitudinal axis of the housing. Additionally, the handle 22 may include padding or messaging elements to aid the user in grasping the handle 22 or operating the present invention. Furthermore, the handle 22 may include finger receiving recesses and/or have an ergonomic configuration.

Figure 5:
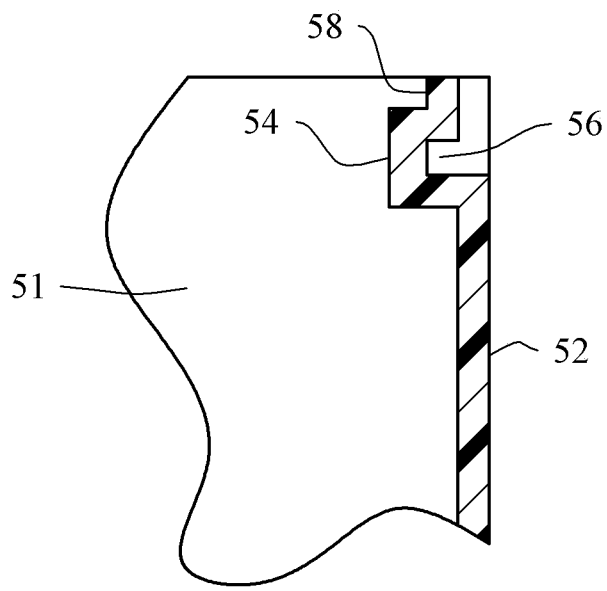
FIG. 5 is a cross-sectional view of the storage container taken along line 5-5 in FIG. 4.

The housing 12 can further include a base 26, traverse with the housing 12. The base 26 can be transverse with a section of the housing 12 that includes the leash retracting mechanism 14 and the handle 22, thereby creating an exposed flat surface. On opposite sides of the base 26, which can be parallel with a longitudinal length of the housing 12, are located slide rails 28. Each slide rail 28 includes a ledge or flange 30, as best illustrated in FIG. 5. The flange 30 of the rails 28 can face each other.

Located at a receiving end of the base 26 is a latching or locking tab 32, which can define a recess or hole.

Extending from the base 26, opposite the leash retracting mechanism 14 and the handle 22, is a wall 34. The wall 34 includes a paraphernalia receiving section 36 featuring at least one hole 38. The receiving section 36 can be configured to slidable receive a portion of an attachable paraphernalia item 80, with a biased member or button 82 of the paraphernalia item 80 being receivable through the hole 38 when the paraphernalia item 80 is received in the receiving section 36, as best illustrated in FIGS. 2 and 3. To remove the paraphernalia item 80 from the receiving section 36, the button 82 is depressed thereby allowing the paraphernalia item 80 to freely travel out from the receiving section 36. The paraphernalia item 80 can be, but not limited to, a ball thrower, a cane, a tool, an umbrella, a scoop or shovel, a flashlight, an additional pet leash assembly, or any other device having a member that is receivable in the receiving section 36.

Since the button 16 is located opposite of the paraphernalia item 80, the user will not accidently operate the button 16 and leash retracting mechanism 14 while using the paraphernalia item 80, as best illustrated in FIG. 2. It can be appreciated that multiple paraphernalia items 80 can be interchangeably attached and used with the housing 12.

In this embodiment, the user may optionally use the housing 12 as a standard retractable animal leash without the paraphernalia item 80 attached thereto, thereby providing a more freely maneuverable housing 12 without the paraphernalia item 80 causing any obstruction of use. The user could then attach the paraphernalia item 80 to the housing 12 when the user wants to use the paraphernalia item. This provides the user flexibility in using the present technology, while providing access to waste collection bags and a storage container for storing wasted filled bags.

At a dispensing end of the base 26, which is opposite the receiving end, is a bag dispensing section 40 that can have a configuration corresponding to a roll or stack of bags 2. An opening 42 is defined through the bag dispensing section 40 allowing a bag 2 to be pulled therethrough. The bag dispensing section 40 can include a pair of parallel side sections extending from the base 26 or the wall 34, and a top section that features the opening 42. The side section can feature an arcuate or curved free end with the top section transversely extending between and partially following the side sections. On either side of the bag dispensing section 40 is located a post 44 extending out therefrom.

A flap or door 46 is pivotably attached to the bag dispensing section 40, which provides access to a chamber that is defined interior of the bag dispensing section 40. The door 46 can be pivoted between an open position, allowing access the chamber, and closed position. In the closed position, a gap can be defined between and a distal edge of the door 46 and a distal edge of the bag dispensing section 40. A clasp, lock or door latching member 48 can be associated with the bag dispensing section 40 and the door 46 to retain the door 46 in a closed position until activated by a user to open the door 46.

Alternatively, the door can be omitted with the bag dispensing section 40 being formed by a continuous wall that defines the chamber. In this configuration, an access panel can be removable attached to a side of the bag dispensing section 40. For example, this access panel can be threadably or pivotably attached, and the post 44 can be associated with the access panel.

The chamber is configured to receive the roll or stage of bags 2. Posts or a shaft can be associated with the chamber to rotatably support a roll of bags 2. The roll or stack of bags 2 can include a plurality of separable interconnecting bags that can be pulled through the opening 42 for use.

Figure 4:
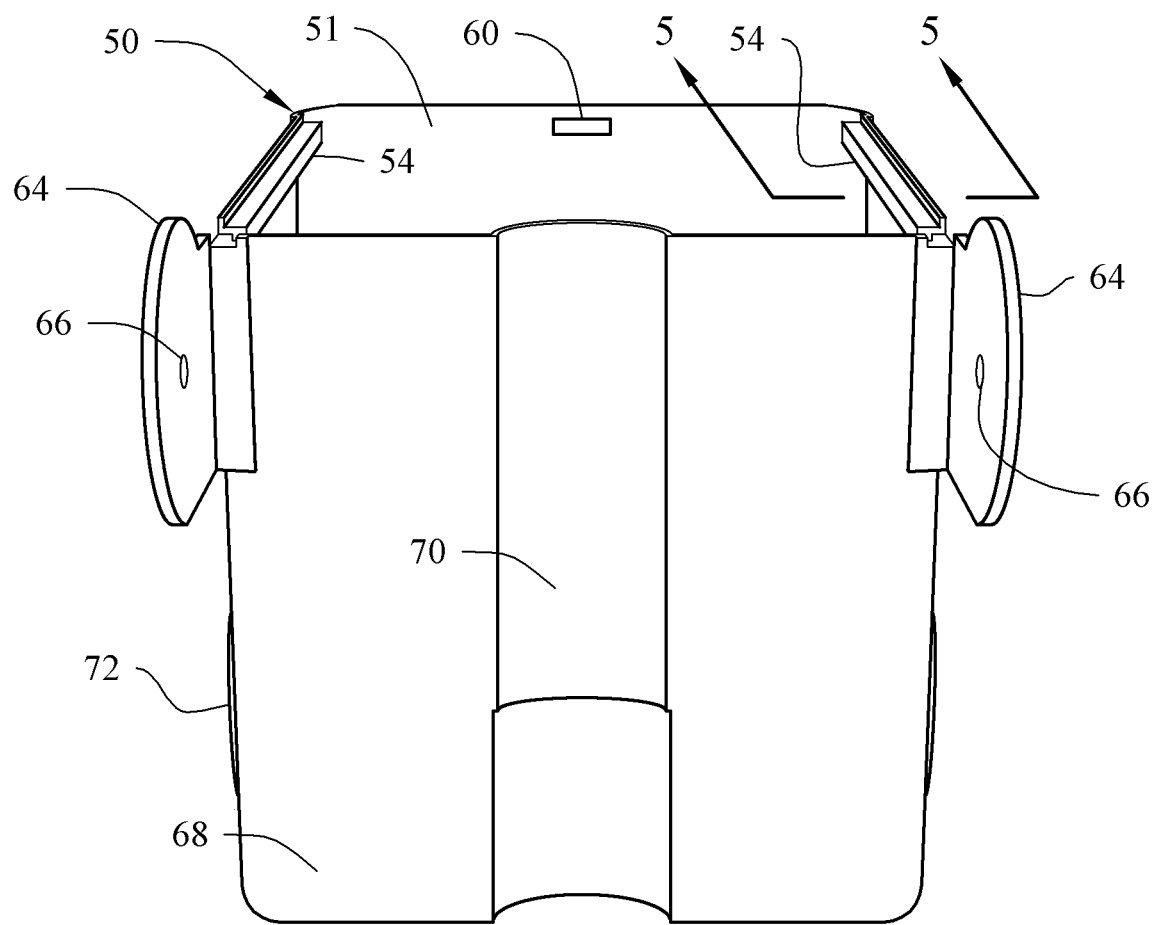
FIG. 4 is a rear perspective view of the storage container of the present technology.

Referring now to FIGS. 1, 4 and 5, the storage container 50 can have a generally open box configuration with a pair of opposite sidewalls 52, a front wall 51, a rear wall 68, and a bottom wall 69. The container 50 can be configured to store items such as, but not limited to, used bags containing waste, balls, toys, personal items, etc. In the exemplary, when user is walking a pet and the pet has defecated. The user could remove one of the bags 2, collect the pet waste in the bag, and place the waste filled bag in the container 50 for later disposal.

Each of the sidewalls 52 can include a track or rider 54 adjacent an edge of its corresponding sidewall. Each rider 54 defines a channel 56 in communication with an interior space of the container 50, and a guide ledge 58, as best illustrated in FIG. 5. The guide ledge 58 can transition to a distal edge of its corresponding sidewall 52, and the guide ledge 58 can be interiorly offset from its corresponding sidewall 52.

Figure 6:
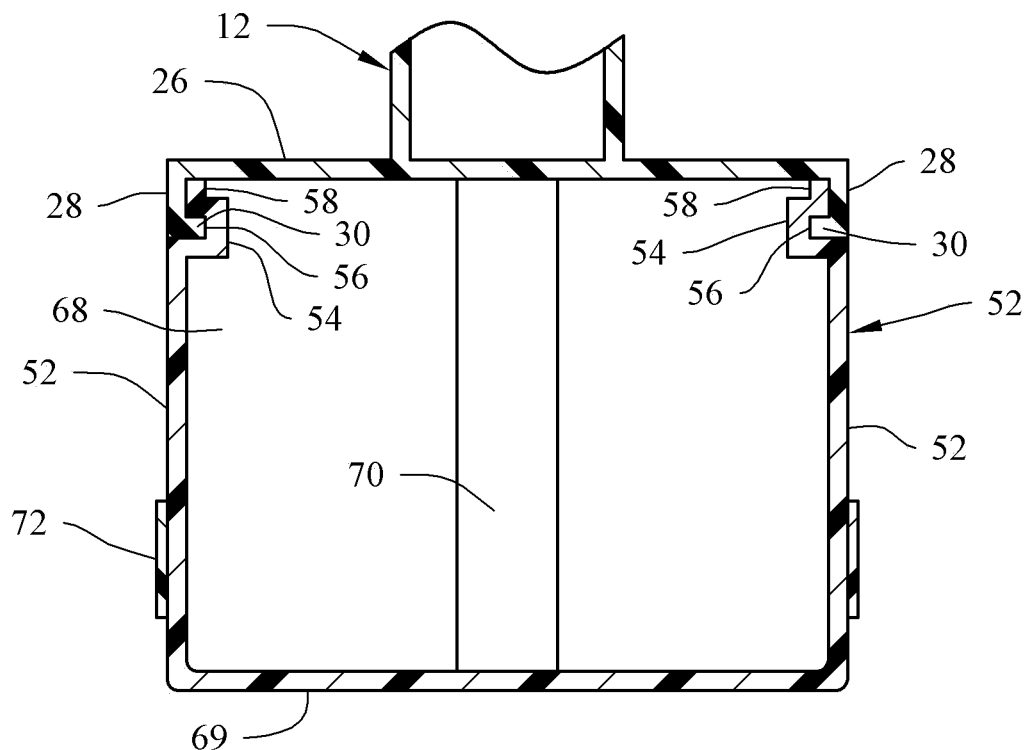
FIG. 6 is a cross-sectional view of the storage container assembled with the leash housing taken along line 6-6 in FIG. 1.

As best illustrated in FIGS. 1 and 4, the channel 56 of each rider 54 can be closed or have a closed end adjacent or near the front wall 51, and can be open or have an open end adjacent or near the rear wall 68. The channel 56 and its open end is configured to slidable receive the flange 30 of a corresponding rail 28, when the container 50 is slidably engaged with the housing 12 so that the rear wall 68 is positioned toward the wall 34. During engagement of the container 50 with the base 26, the guide ledge 58 can laterally receive a web portion of it corresponding rail 28. This arrangement can provide stability and guidance while moving the container 50 along the rails 28, and the flange 30 received in the channels 56 can retain the container 50 in relation to the base 26. The interiorly offset arrangement of the guide ledge 58 can be configured so that an exterior surface of the sidewalls 52 can be flush with an edge of the base 26, as best illustrated in FIG. 6.

Figure 7:
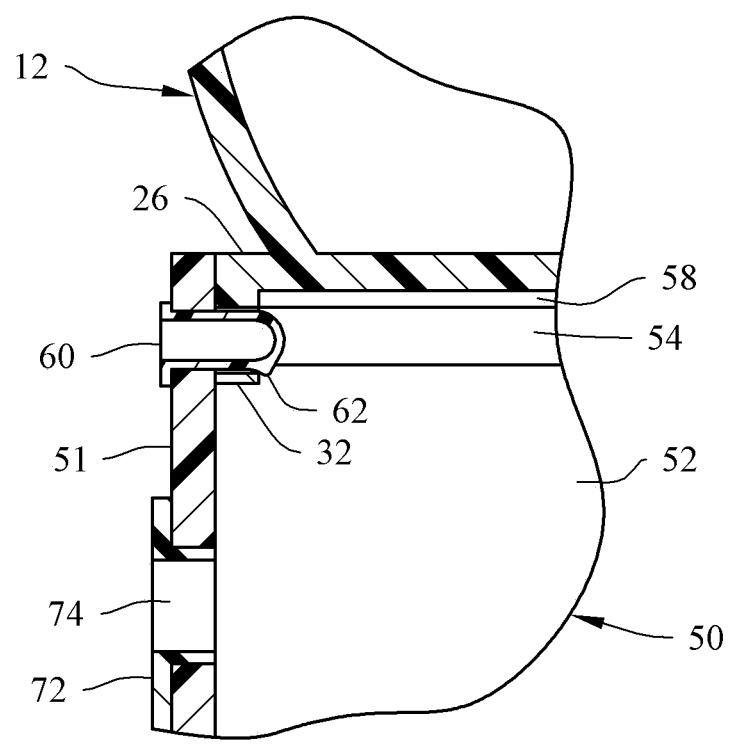
FIG. 7 is a cross-sectional view of the latch assembly of the storage container when engaged with the leash housing.

In the exemplary, a latching or locking member 60 can be associated with, extend from or extend through the front wall 51. The locking member 60 can have a latch 62 that is engageable with the hole of the locking tab 32 when the container is assembled with the housing 12, as best illustrated in FIG. 7. It can be appreciated that other retaining structures or assemblies can be utilized with the present technology to retain the container 50 with the housing 12 until removed by the user. Such other assemblies can be, but not limited to, magnets, locks, spring biased members, rotating members, or the like.

Extending or transitioning from the sidewalls 52 or the rear wall 68 is a pair of container retaining sections 64. The retaining sections 64 are spaced apart so as to slide over the sides of the bag dispensing section 40 so that a hole or recess 66 defined in each of the retaining sections 64 can receive one of the posts 44, when the container 50 is assembled with the housing 12.

The rear wall 68 can include an indented region 70 that has a configuration corresponding or capable of receiving the receiving section 36 of the wall 34, as best illustrated in FIG. 4.

A handle member 72 can be attached to, associated with or integral with the front wall 51. The handle member 72 can define a slot 74 configured to allow a user's hand or fingers to be received therein, thereby providing a grip hold to pull, push or manipulate the container 50.

Figure 8:
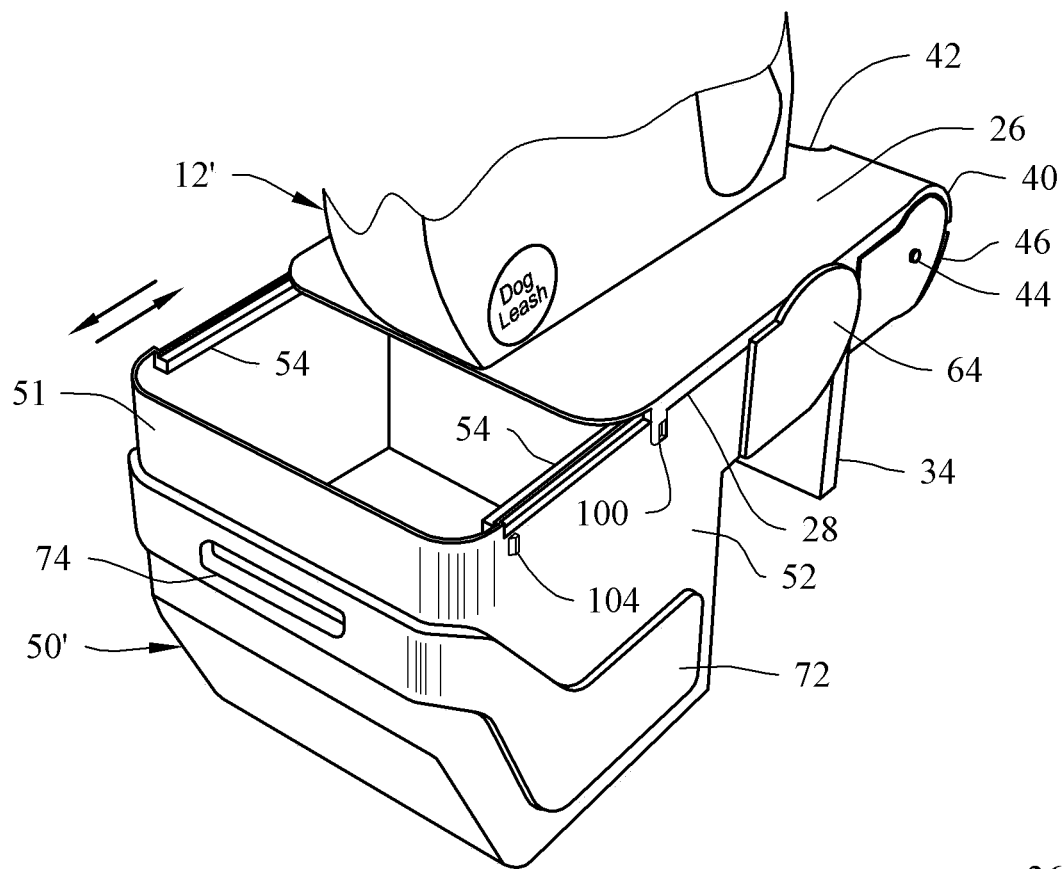
FIG. 8 is a left perspective view of an alternate embodiment of the animal waste collection and storage system constructed in accordance with the principles of the present technology.
Figure 9:
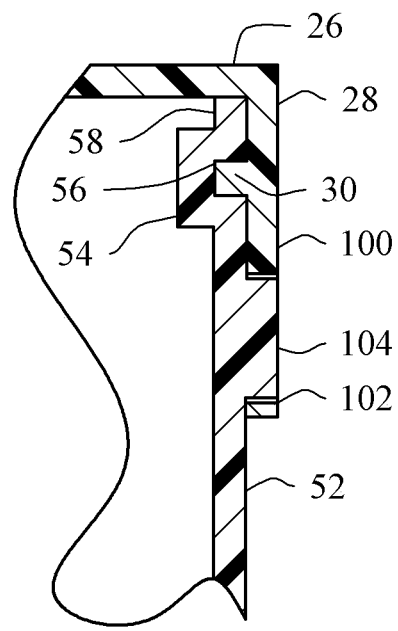
FIG. 9 is a cross-sectional view of the latch assembly of the alternate storage container when engaged with the alternate leash housing.
Figure 10:
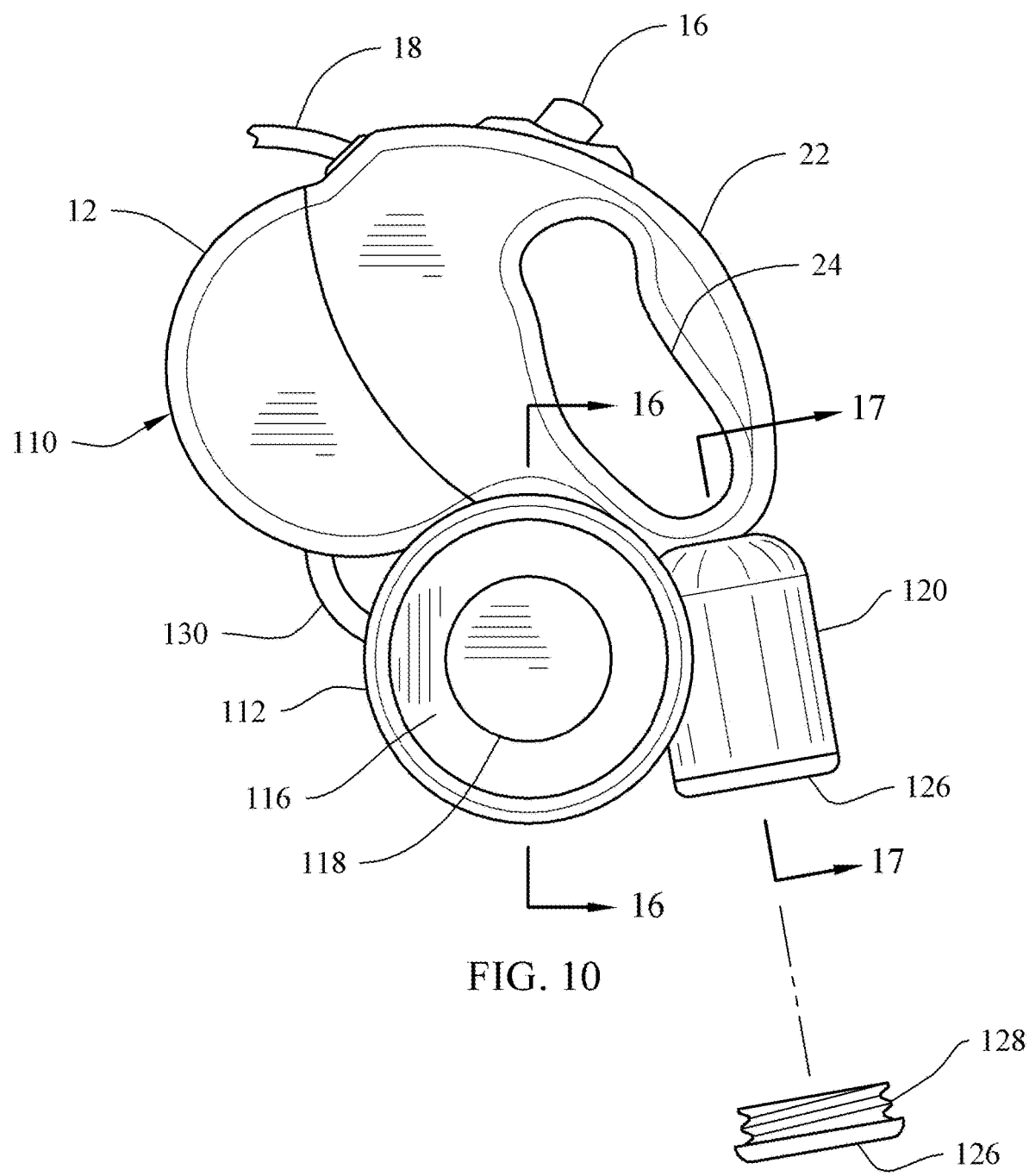
FIG. 10 is a left plane view of an alternate embodiment of the animal waste collection and storage of the present technology, with the phantom lines depicting environmental structure and forming no part of the claimed present technology.
Figure 11:
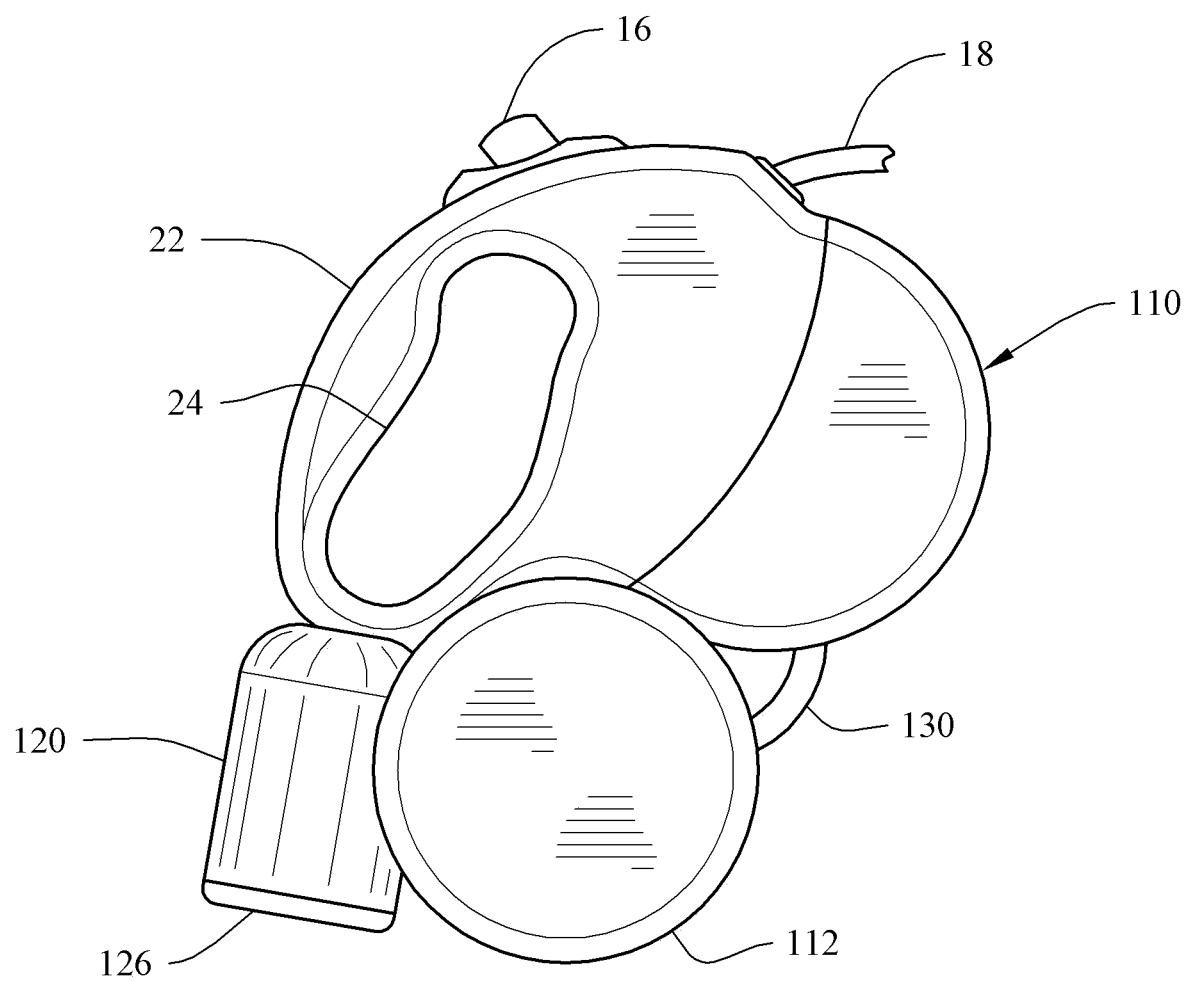
FIG. 11 is a right plane view of the alternate embodiment of the present technology.
Figure 12:
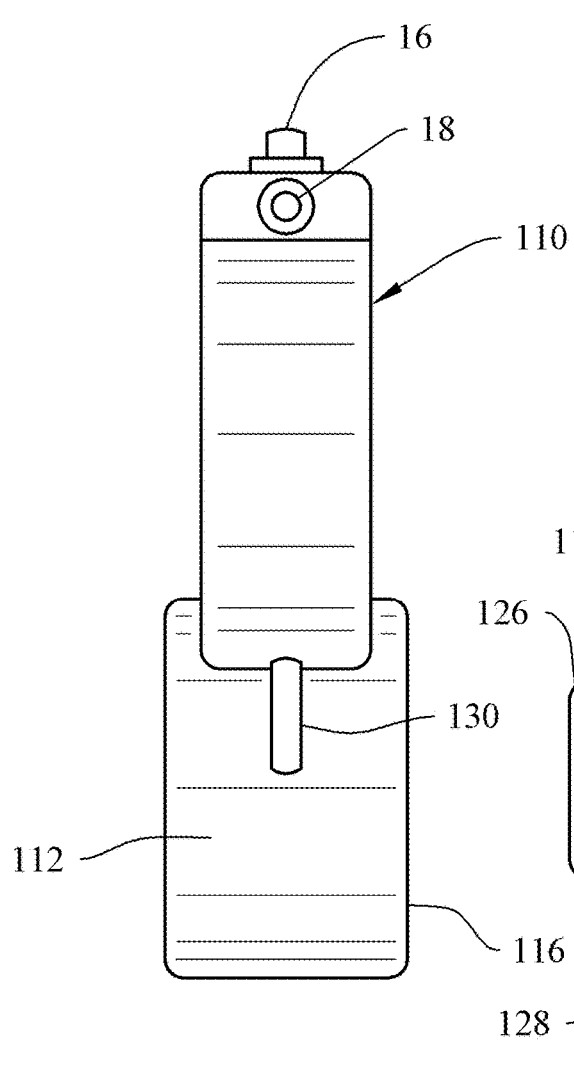
FIG. 12 is a front plane view of the alternate embodiment of the present technology.
Figure 13:
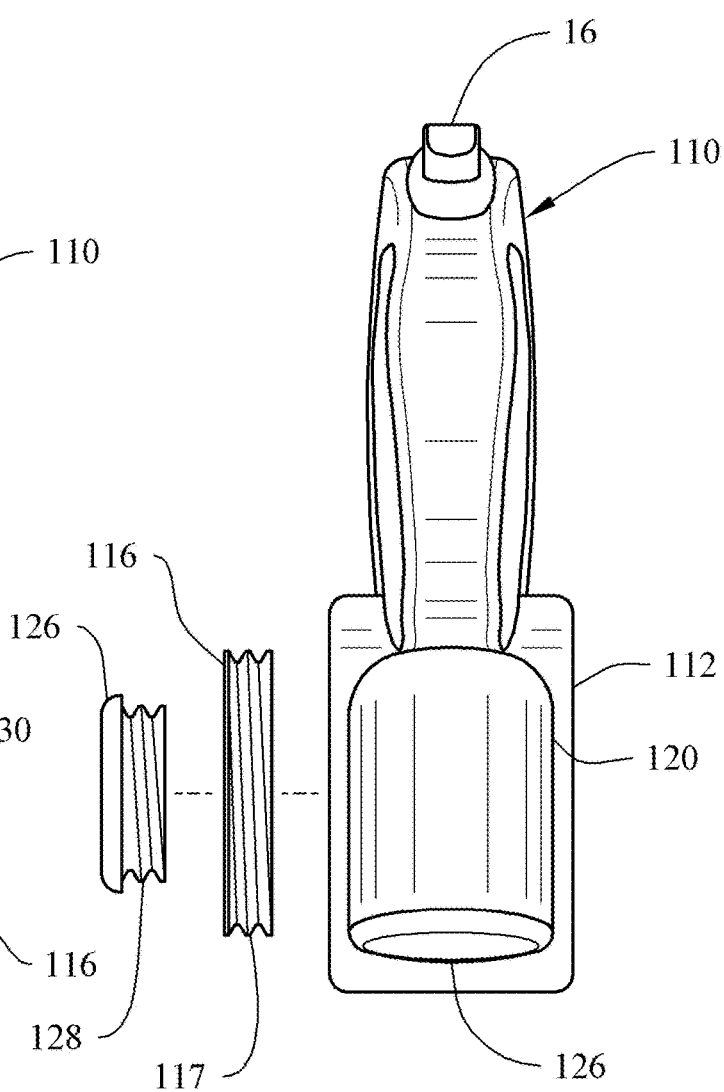
FIG. 13 is a rear plane view of the alternate embodiment of the present technology, with the container cap and bag cap exploded.
Figure 14:
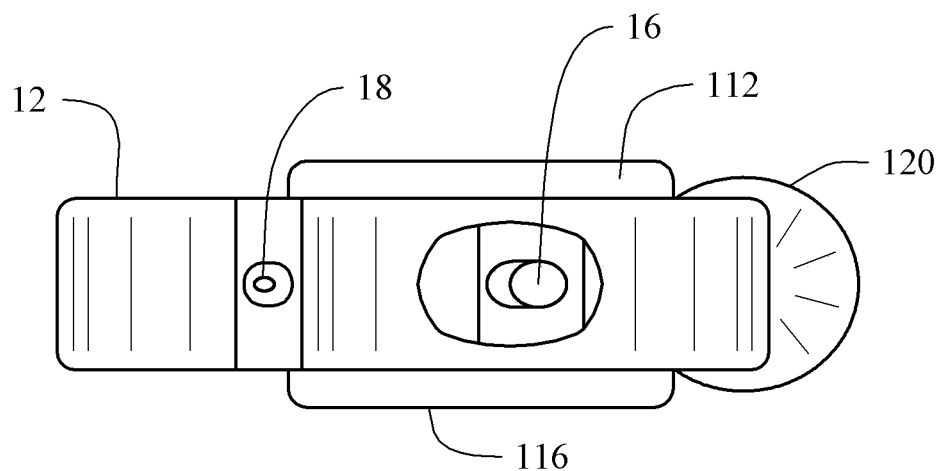
FIG. 14 is a top elevational view of the alternate embodiment of the present technology.
Figure 15:
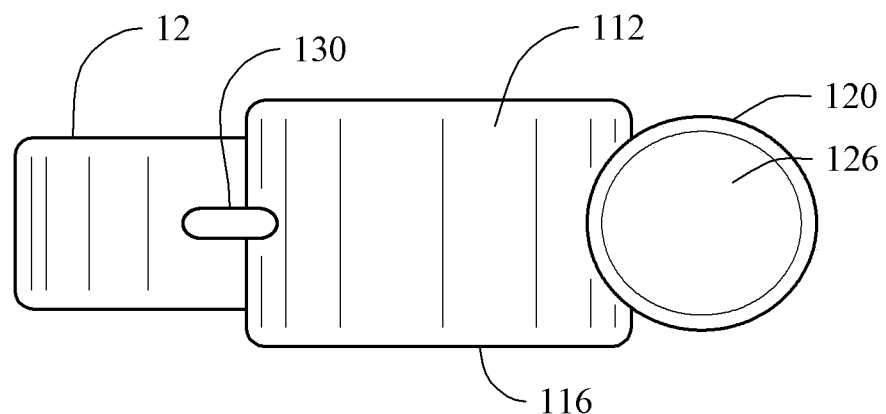
FIG. 15 is a bottom elevational view of the alternate embodiment of the present technology.

Referring to FIGS. 8 and 9, an alternate embodiment housing 12' and container 50' is illustrated and described herewith. The housing 12' omits the locking tab from the front edge of the base 26, and in place provides a side locking tab 100 located on either side of the base 26 adjacent an end of the rails 28 near the front edge of the base 26. Each side locking tab 100 defines a recess or locking hole 102. The side locking tabs 100 are spaced apart to receiving therebetween the edges of the sidewalls 52 containing the riders 54.

The container 50' omits the locking member from the front wall 51, and in place provides side locking members 104 on each of the sidewalls 52. Each side locking member 104 is configured to be received in a corresponding locking hole 102 when the container 50' is assembled with the housing 12', thereby retaining the container 50' with the housing 12' until removed by the user. The side locking members 104 can include a ramp surface allowing for smooth travel against an interior side of its corresponding side locking member 104 until aligned with the locking hole 102.

It can be appreciated that the housing and storage container can be made of, but not limited to, plastics, metals, alloys, or composites. Furthermore, the housing, the base and the bag dispensing section can be integrally formed as a single unit.

In use, it can now be understood that a user could attach the clip 20 or the leash 18 to an animal collar or harness, and then take the animal for a walk. The user could operate the leash activation button 16 of the housing 12, 12' to control the retracting mechanism 14 to advance, lock or retract the leash 18. To manipulate the housing, the user could grasp the handle 22 with one hand thereby leaving the other hand free for use.

If the animal defecates, the user could remove one of the bags 2 from the opening 42, and collect the animal waste inside the bag 2. The user could then tie the bag 2 closed. The storage container 50, 50' can be opened by sliding the storage container away from the wall 34, thereby providing access to the interior of the storage container. The user could place the closed wasted filled bag into the storage container, and then close the storage container by sliding it toward the wall 34 until the recess 66 are located over their corresponding posts 44 and received therein. In this position, the side locking member 60, 104 is engaged with the locking tab 32, 100, which further retains the storage container in this closed position.

In addition or alternately, the user could store items for use in the storage container, and the access these items by sliding the storage container open.

To replenish the bags, the user could operate the door latching member 48 and then pivot the door 46 to the open position. A new roll or stack of bags can then be inserted into the chamber of the bag dispensing section 60. The door 46 can then be pivoted closed for retaining the bags in the chamber.

Further in the alternative, a paraphernalia item 80 can be attached to and utilized with the housing by inserted a portion of the paraphernalia item into the paraphernalia receiving section 36 of the housing. In the exemplary, the paraphernalia item 80 could be a ball thrower with an end of the ball thrower inserted into the receiving section 36 until a biased member 82 is received in or engaged with the hole 38. The user could invert the housing so that the ball thrower is orientated in an operable position, and grasp the handle 22 to operate the ball thrower. It can be appreciated that usage of the ball thrower can be accomplished with the storage container assembled with the housing.

It can be appreciated that the paraphernalia item 80 can be joined with the paraphernalia receiving section 36 by means different to that illustrated and described herewith. Such joining arrangements can utilize, but not limited to, threading, latches, a biased member, a slot and key, a magnet or any other mechanical separate connection.

The ball thrower can include a shaft with an end of which can be received and retained in the paraphernalia receiving section. The shaft can include a ball receiving end located at a free distal end of the shaft, and defines a ball receiving opening configured to receive a ball therein. The shaft can be made of a material having sufficient shape memory and flexibility so as to allow the shaft to flex and force the ball out of the ball receiving element, and then return to its previous shape and position.

Referring to FIGS. 10-17, a new and novel alternate animal waste collection and storage system 110 of the present technology for collecting and storing animal waste is illustrated and will be described. More particularly, the animal waste collection and storage system 110 can include a leash housing 12, a storage container 112, a bag container 120. The storage container 112 and/or the bag container 120 can be integrally formed with the housing 12 or can be removably attachable to the housing 12.

The housing 12 can have a main body that encloses a leash retracting mechanism. A leash activation button 16 can be operational through the housing 12 to actuate and control the leash retracting mechanism. The housing 12 can be formed from at least two halves or sections joined together to form the housing. The leash retracting mechanism can include, but not limited to, a spring biased ratcheting spool configured to retract a leash, lead or length of cord 18 into the housing 12 and around the spool. When operated by the user, the button 16 prevents the leash retracting mechanism from operating or rotating, and thereby locks the leash retracting mechanism in place. A locking pin can be associated and operably engageable with the button 16, and when activated by the user, locks the button 16 in an operational position, thereby keeping the button 16 engaged with the leash retracting mechanism until the user disengages the locking pin from the button 16. A portion of the button 16 extends out from the housing 12, so as to be operated by the user. The button 16 can include a spring (not shown) so as to force the button to a position that is disengaged from the leash retracting mechanism.

In the exemplary, the button 16 can operate a lock-release mechanism that can include includes an element which can be moved up and down. This movement is against the resistance of a spring. The element of the lock-release mechanism can be received in openings, slots or ratchet teeth associated with the leash retracting mechanism. While the element is received in one of the ratchet teeth, the leash retracting mechanism is held against rotation.

Releasing pressure on the button 16 or allowing the button to move away from the leash retracting mechanism would result in the element moving out of engagement with the ratchet teeth, thereby allowing the leash retracting mechanism to retract consequently retracting the leash into the housing 12.

It can be appreciated that more than one leash retracting mechanism, button 16, and leash 18 can be incorporated into the present technology, thereby allowing the user to walk two or more animals at the same time. It can also be appreciated that a shock absorbing means can be operationally engaged with the leash retracting mechanism or the leash 18, for absorbing a rapid increasing in pulling force or jerk-like force from the animal attached to the leash.

The leash 18 can exit the housing 12 through a hole located opposite a handle 22 formed in or attached to the housing 12. It can be appreciated that the hole can have any shape or configuration that allows the leash 18 to pass therethrough. One end of the leash 18 is secured to the spool or the leash retracting mechanism by any suitable means, while the free end is exterior of the housing 12 and includes or is attachable to a clip or a pet collar.

The handle 22 can define an opening 24 configured and ergonomically shaped to receive the users hand and/or fingers therein. The handle 22 and opening 24 may have different shapes and configurations, such as but not limited to, being angled in relation to the longitudinal axis of the housing. Additionally, the handle 22 may include padding or messaging elements to aid the user in grasping the handle 22 or operating the present invention. Furthermore, the handle 22 may include finger receiving recesses and/or have an ergonomic configuration.

A clip member 130 can extend from the housing 12 and/or the storage container 112, allowing the user to attach to the clip member 130 an end of the leash 18 or a clip associated with the leash 18. The clip member 130 can be curved in shaped extending from the housing 12 to the storage container, consequently defining an open space between the clip member 130 and the housing 12 or the storage container 1. It can be appreciated that the clip member 130 can be used to hang the housing 12 or any other object from the housing 12. It can further be appreciated that the clip member 130 can be located in any other location of the alternate animal waste collection and storage system 110.

Referring to FIGS. 10-16, more specifically to FIG. 16, the storage container 112 can have a generally open cylinder configuration defining an internal cavity 114, and with a cylindrical sidewall, a closed end wall, and an open end 113. The internal cavity 144 of the storage container 112 can be configured to store items such as, but not limited to, used bags containing waste, balls, toys, personal items, etc. A longitudinal axis of the storage container 112 can be orientated perpendicular, transverse or parallel to a longitudinal axis of the handle 22.

A container cap 116 can be attached to the open end 113 to close off the internal cavity 114 and store an object in the storage container 112.

In the exemplary, when user is walking a pet and the pet has defecated. It can be appreciated that the storage container 112 and/or the container cap 116 can have any geometric shape, and/or the closed end of the storage container 112 can be a second open end configured to receive a second cap or other threadable object.

The container cap 116 can include external threading 117 engageable with internal threading of the open end 113, thereby allowing the container cap 116 to close the open end 113 and retain objects in the internal cavity 114. A seal (not shown) can be associated with the open end 113 and/or the container cap 116 to make the storage container 112 watertight and/or airtight.

The container cap 116 can further include a recess 118 defined in a side thereof configured to receive a bag container cap 126. The recess 118 can include internal threading engageable with external threading 128 associated with a post extending from the bag container cap 126. This allows the bag container cap 126 to be retained with the container cap 116 when not in use.

Referring to FIGS. 10-15 and 17, more specifically to FIG. 17, the bag container 120 can have a generally open cylinder configuration defining an internal cavity 122, and with a cylindrical sidewall, a closed end wall, and an open end 124. The internal cavity 122 of the bag container 120 can be configured to store items such a, but not limited to, bags or a roll of bags 2. The bag container 120 can define an opening or slot therethrough configured to allow removal of a bag 2 from the internal cavity 122. A longitudinal axis of the bag container 120 can be orientated in a substantially same direction, angled, parallel or perpendicular to the longitudinal axis of the handle 22 or the longitudinal axis of the storage container 112.

A shaft 123 can extend from the closed end wall into the internal cavity 122. The shaft 123 can be configured to be inserted into a roll of bags 2, and to allow the roll of bags 2 to rotate and consequently dispense one or more bags from the internal cavity 122.

A bag container cap 126 can be attached to the open end 124 of the bag container 120 to close off the internal cavity 122 and store bag 2 in the bag container 120.

It can be appreciated that the bag container 120 and/or the bag container cap 126 can have any geometric shape, and/or multiple bag containers 120 can be utilized with the present technology.

The bag container cap 126 can include external threading 128 configured to be engageable with internal threading of the open end 124 of the bag container 12, thereby allowing the bag container cap 126 to close the open end 124 of the bag container 120 and retain the bags 2 in the internal cavity 122. The external threading 128 of the bag container cap 126 can also be configured to be engageable with the internal threading of the recess 118 of the container cap 116, thereby allowing the bag container cap 126 to be secured when not in use.

A seal (not shown) can be associated with the open end 124 and/or the bag container cap 126 to make the bag container 120 watertight and/or airtight.

The user could remove one of the bags 2 from the bag container 120 either by removing the bag container cap 126 pulling a bag 2 out therefrom, or by pulling a bag 2 through an opening or slot defined through the bag container 120. After which, the user can collect the pet waste in the bag, and then remove the container cap 116 and place the waste filled bag in the internal cavity 114 of the storage container 112 for later disposal.

Alternatively, with the bag container cap 126 removed, an end 134 of a paraphernalia item 132 can be engageable with the open end 124, the sidewall or the internal cavity 122 of the bag container 120. This allows for additional items to be utilizing with the present technology. The peripheral item can be, but not limited to, a ball thrower, a cane, a tool, an umbrella, a scoop or shovel, a flashlight, an additional pet leash assembly, or any other device having a member that is receivable in the receiving section 36.

Figure 18:
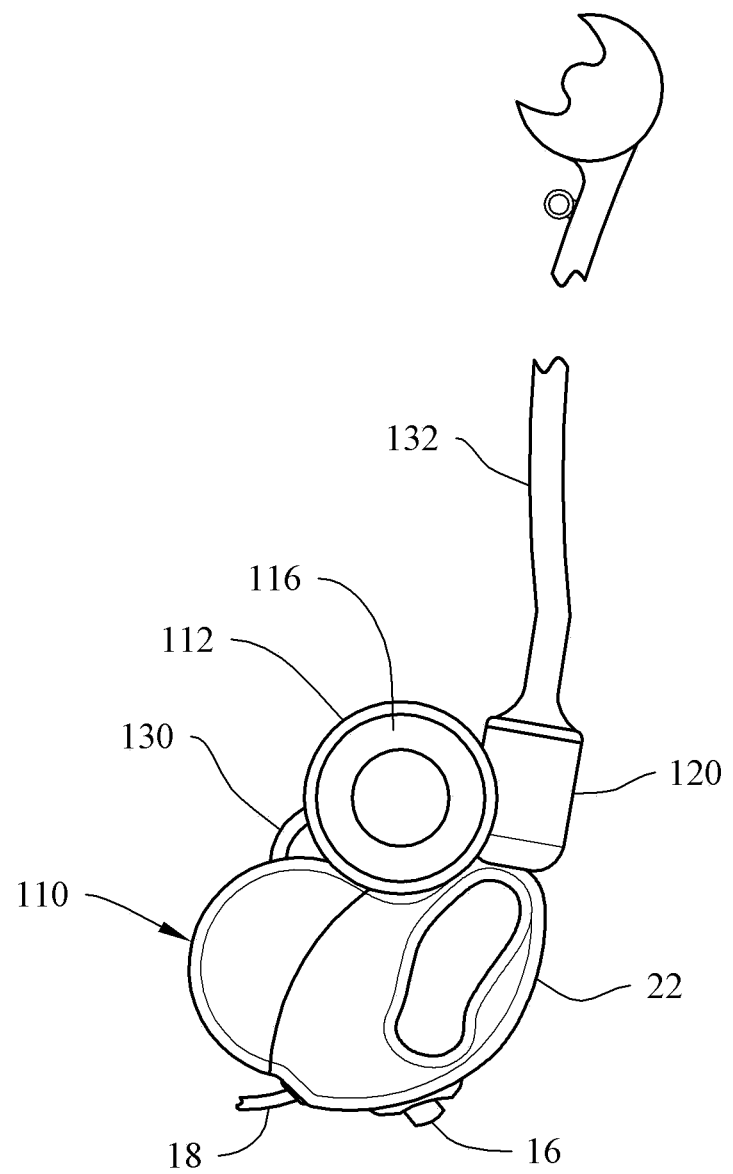
FIG. 18 is a left plane view of the alternate embodiment of the present technology with the ball thrower attached to the bag dispenser in an in-use orientation.

Referring to FIG. 18, in the exemplary, the peripheral item can be a ball thrower 132 with an end of the ball thrower inserted and/or attached to the open end 124, the sidewall or the internal cavity 122 of the bag container 120. The user could invert the housing 12 so that the ball thrower 132 is orientated in an operable upright position, and grasp the handle 22 to operate the ball thrower. It can be appreciated that usage of the ball thrower 132 can be accomplished by removing the bag container cap 126, with the option of storing the ball container cap 126 in the recess 118.

It can be appreciated that the paraphernalia item 132 can be joined with the open end 124 of the bag container 120 by means different to that illustrated and described herewith. Such joining arrangements can utilize, but not limited to, threading, latches, a biased member, a slot and key, a magnet or any other mechanical separate connection. In the alternative, the paraphernalia item 132 can be joined or attached to the open end 113 of the storage container 112.

The ball thrower 132 can include a shaft with the end 134 of which being received and retained in the open end 124 or internal cavity 122 of the bag container 120. The shaft can include a ball receiving end located at a free distal end of the shaft, and defines a ball receiving opening configured to receive a ball therein. The shaft can be made of a material having sufficient shape memory and flexibility so as to allow the shaft to flex and force the ball out of the ball receiving element, and then return to its previous shape and position.

Figure 19:
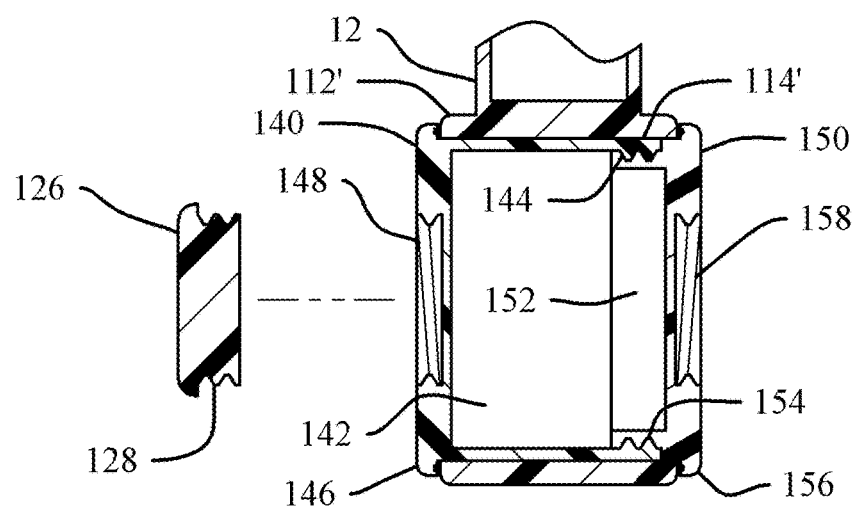
FIG. 19 is a cross-sectional view of the alternate embodiment storage container and cap assembly of the present technology.
Figure 20:
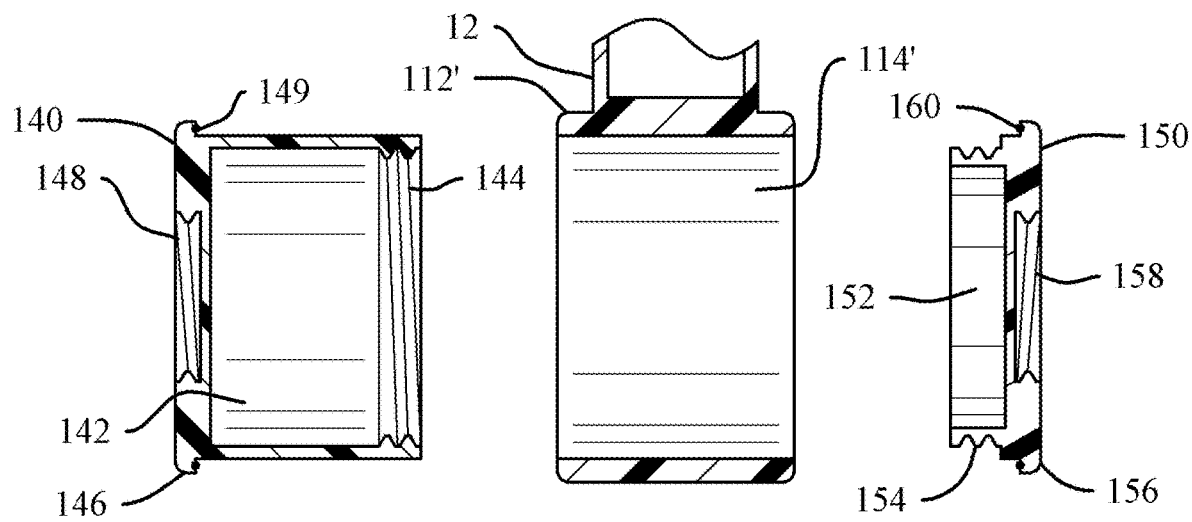
FIG. 20 is an exploded cross-sectional view of the alternate embodiment storage container and cap assembly of the present technology.

Referring to FIGS. 19-20, an alternate embodiment storage container 112' and container cap assembly can be utilized with the present technology. The storage container 112' can include an internal cavity or bore 114' defined therethrough. The bore 114' can be, but not limited to, cylindrical, square, rectangular, triangular or any suitable geometric shape.

The cap assembly can include a cup-shaped container cap 140 and an end cap 150. A portion of the cup-shaped container cap 140 can have a width or diameter configured to be slidably received in the bore 114'. The container cap 140 can include an internal cavity 142, an open end 144 and a flanged closed end 146. The flanged closed end 146 can have a width or diameter greater than the width or diameter of the open end 114, and can be greater than a width or diameter of the bore 114', thereby creating a stop edge that can contact a side of the storage container 112' when the open end 144 is inserted into the bore 114'.

The flanged closed end 146 can define a recess 148 configured to threadably engage with the threaded post 128 of the bag container cap 126, as discussed above, thereby allowing the bag container cap 126 to be store when not in used.

The end cap 150 can include a portion having a width or diameter configured to be slidably received in the open end 144 and may further be received into the internal cavity 142 of the cup-shaped container cap 140. The end cap 150 can include an internal cavity 1152, an open end 154 and a flanged closed end 156. The flanged closed end 156 can have a width or diameter greater than the width or diameter of the open end 154, and can be greater than the width or diameter of the bore 114', thereby creating a stop edge that can contact a side of the storage container 112' when the open end 154 is inserted into the bore 114' and into the open end 144 or the internal cavity 142 of the cup-shaped container cap 140.

The flanged closed end 156 can define a recess 158 configured to threadably engage with the threaded post 128 of the bag container cap 126, as discussed above, thereby allowing the bag container cap 126 to be store when not in used.

As best illustrated in FIG. 20, a seal or o-ring 149 can be associated with the stop edge of the flanged closed end 146 of the cup-shaped container cap 140 that contacts a side of the storage container 112'. Furthermore, a seal or o-ring 160 can be associated with the stop edge of the flanged closed end 156 that contacts the side of the storage container 112'.

In use, the user can insert the open end 144 of the storage container cap 140 into a first side of the storage container 112' defining the bore 114' until the o-ring 149 or the stop edge defined by the flanged closed end 146 contacts the first side of the storage container 112'. The user can then insert the open end 154 of the end cap 150 into a second side of the storage container 112' defining the bore 114' and into the open end 144 of the storage container cap 140 until the o-ring 160 or the stop edge defined by the flanged closed end 156 a second side of the storage container 112' defining the bore 114'.

The open end 144 of the storage container cap 140 can include internal threading configured to engage with external threading included with the open end 154 of the end cap 150, thereby allowing them to squeeze together when one or both are rotated.

The user could remove a bag from the bag container, collect any animal waste or feces, then seal or tie the bag, then unscrew the container cap 140 or the end cap 150 from each other, and then place the feces containing bag into the internal cavity 142 of the container cap 140. After which, the open end 144 can be inserted into the bore 114' from the first side of the storage container 112', and the open end 154 of the end cap 150 can be inserted into the bore 114' from the second side of the storage container 112' and into the open end 144 of the container cap 140. The user can then screw the container cap 140 and the end cap 150 together, thereby squeezing the flanged closed ends 146, 156 together. This squeezing action can consequently cause the o-rings 149, 160 to seal against their correspond sides of the storage container 112', thereby making an airtight and/or watertight seal.

The sealed storage container 112', container cap 140 and end cap 150, can contain any leakage of feces from the bag stored therein and/or contain the odor of the feces.

Figure 21:
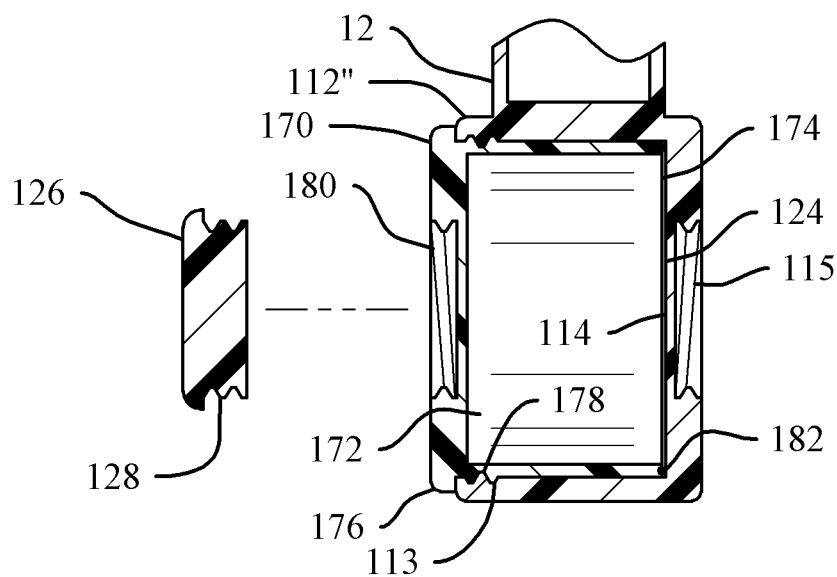
FIG. 21 is a cross-sectional view of the alternate embodiment storage container and cap of the present technology with the bag container cap exploded.

Referring to FIG. 21, an alternate embodiment storage container 112" and container cap 170 can be utilized with the present technology. The storage container 112" can have a generally open cylinder configuration defining an internal cavity 114 defined by a cylindrical sidewall, an open end, and a closed end. Threading 113 can be included on an internal surface of the sidewall defining the internal cavity 114 and adjacent the open end. A longitudinal axis of the storage container 112" can be orientated perpendicular, transverse or parallel to the longitudinal axis of the handle.

The closed end of the storage container can include the recess 115 defined in a side of the closed end. The recess 115 can be configured to receive the bag container cap 126. The recess 115 can include internal threading engageable with the external threading 128 associated with the post extending from the bag container cap 126. This allows the bag container cap 126 to be retained with the storage container 112" when not in use.

The container cap 170 can have a generally open cup-shaped cylinder configuration defining an internal cavity 172 defined by a cylindrical sidewall, an open end 174, and a closed end 176. The open end 174 can be inserted into the internal cavity 114 of the storage container 112". Where the internal cavity 172 of the container cap 170 can be configured to store items therein.

The container cap 170 can include external threading 178 external of a cylindrical sidewall defining the internal cavity 172 adjacent the closed end 176. The external threading 178 can be engageable with internal threading 113 of the open end, thereby allowing the container cap 170 to be secured in the internal cavity 114 and retain objects therein.

A recess 180 can be defined in a side of the closed end 176, and configured to receive the bag container cap 126. The recess 180 can include internal threading engageable with the external threading 128 associated with the post extending from the bag container cap 126. This allows the bag container cap 126 to be retained with the container cap 170 when not in use.

A seal 182 can be associated with the open end 174 and/or the closed 176 to make the storage container 112" watertight and/or airtight when the container cap 170 is screwed to the storage container 112".

In the exemplary, when user is walking a pet and the pet has defecated. It can be appreciated that the storage container 112" and/or the container cap 170 can have any geometric shape.

Figure 22:
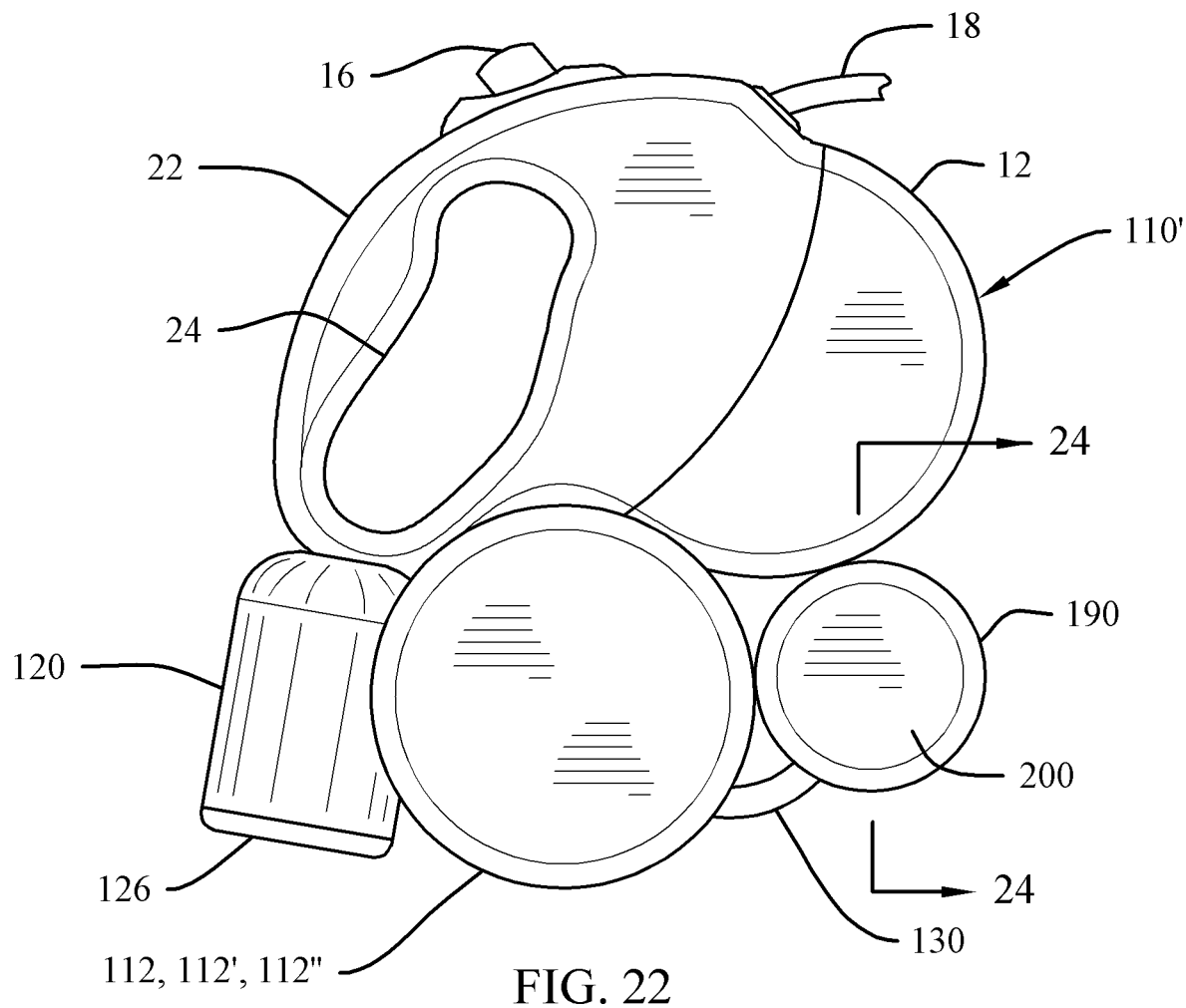
FIG. 22 is a right plane view of another alternate embodiment of the present technology including a second storage container.
Figure 23:
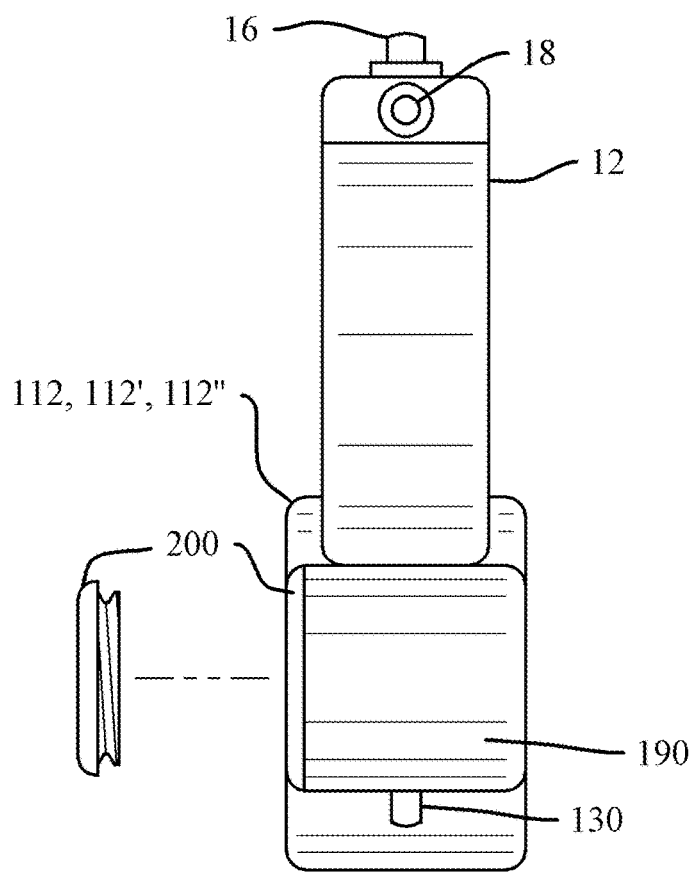
FIG. 23 is front plane view of the alternate embodiment storage container and cap of FIG. 22 with the second container cap in an assembled and an exploded position.
Figure 24:
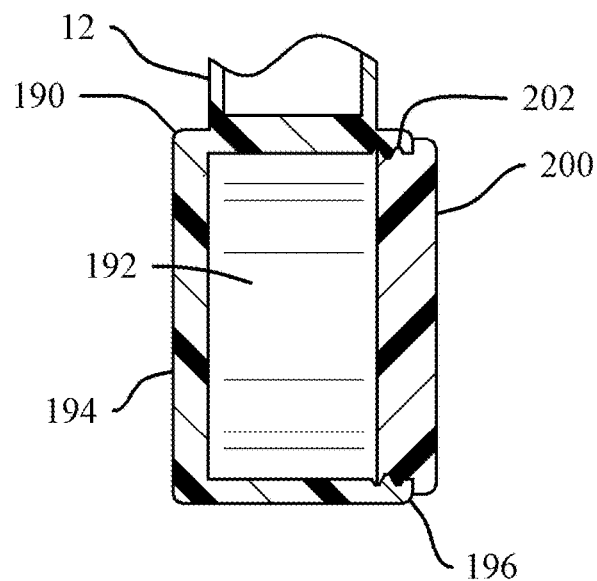
FIG. 24 is a cross-sectional view of the second storage container with the second container cap assembled taken along line 24-24 in FIG. 22.

Referring to FIG. 22, an alternate embodiment animal waste collection and storage system 110' of the present technology for collecting and storing animal waste is illustrated and will be described. The system 110' can include the housing 12, any of the storage containers 112, 112', 112" of the present technology and the bag container 120. The system 110' can further include a second storage container 190 attachable to or integral with the housing 12 and/or the storage container 112, 112', 112". The second storage container 190 can be smaller in size, width or diameter than the storage container 112, 112', 112".

The clip member 130 can extend between the storage container 112, 112', 112" and the second storage container 190, or between the housing 12 and the second storage container 190.

The second storage container 190 can have a generally open cylinder configuration defining an internal cavity 192 defined by a cylindrical sidewall, an open end 196, and a closed end 194. Threading can be included on an internal surface of open end 196, and adjacent the open end. A longitudinal axis of the second storage container 190 can be orientated perpendicular, transverse or parallel to the longitudinal axis of the storage container 112, 112', 112".

A second storage container end cap 200 can be included to close of the internal cavity 192 of the second storage container 190. External threading 202 can be included with the end cap 200 that is configured to be engageable with the internal threading of the second storage container 190. The external threading 202 can be engageable with internal threading of the open end 196, thereby allowing the end cap 200 to be secured to the second storage container 190 and retain objects therein.

The second storage container 190 can be used, in the exemplary, to store bags therein when the bag container 120 is utilized with the ball thrower.

It can be appreciated that the open end 196 of the second storage container 190 can be facing in a direction the same as the open end or ends of the storage container 112, 112', 112", or opposite to allow for unobstructed removal of the second storage container end cap 200.

While embodiments of the animal waste collection and storage system have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although collecting and storing animal waste have been described, it should be appreciated that the system of the present technology herein described is also suitable for storing usable items with a pet leash and/or utilizing objects with a pet leash.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A retractable leash system comprising:
    a housing including a leash retracting mechanism configured to provide retraction of a leash extending out of the housing;
    a first container defining a first container internal cavity and a first container open end, and including a first container cap securable to the first container open end; and
    a second container defining a second container internal cavity and a second container open end, and including a second container cap configured to be engageable to the second container open end in an in-use position and to the first container cap in a storage position, the second container internal.

2. The retractable leash system as claimed in claim 1, wherein the first container cap includes a first side and a second side, the second side defining a recess therein.

3. The retractable leash system as claimed in claim 2, wherein the second container cap includes a post extending from a first side of the second container cap, the post includes threading engageable with threading of the recess.

4. The retractable leash system as claimed in claim 3, wherein the second container further comprises a shaft extending into the second container internal cavity, the shaft being configured to rotatably support a roll of bags.

5. The retractable leash system as claimed in claim 2, wherein the first container internal cavity is a bore defined through the first container, wherein the first container cap is cup-shaped defining a first container cap internal cavity, and wherein the second side of the first container cap is a flanged end having a size greater than the first side, and the first side is an open end in communication with the first container cap internal cavity and configured to be receivable in a first end of the bore.

6. The retractable leash system as claimed in claim 5 further comprising a first container end cap including a first end and a flanged end, the first end being configured to be received in a second end of the bore and in the open end of the first container cap, and the flanged end having a size greater than the first end of the first container end cap.

7. The retractable leash system as claimed in claim 6, wherein the flanged end of the first container cap being associated with a first seal and the flanged end of the first container end cap being associated with a second seal, and wherein the first seal being configured to contact a first side of the first container and the second seal being configured to contact a second side of the first container when the first container cap and the first container end cap are assembled in the bore.

8. The retractable leash system as claimed in claim 1 further comprising a ball thrower including a first end and a ball receiving end, the first end of the ball thrower including threading configured to engage with threading of the second container open end when the second container cap is removed from the second container open end.

9. The retractable leash system as claimed in claim 1 further comprising a third container, the third container defining a third container internal cavity and a third container open end, and including a third container cap securable to the third container open end.

10. The retractable leash system as claimed in claim 9, wherein the first container, the second container and the third container are cylindrical.

11. The retractable leash system as claimed in claim 10, wherein a portion of a cylindrical sidewall of the first container and a portion of a cylindrical sidewall of the third container are both integral with a portion of the housing so that a longitudinal axis of the first container and the third container are parallel.

12. The retractable leash system as claimed in claim 11, wherein a portion of an end wall of the second container is integral with a second portion of the housing so that a longitudinal axis of the second container is different to the longitudinal axis of the first container and the third container.

13. A retractable leash system comprising:
a housing including a leash retracting mechanism configured to provide retraction of a leash extending out of the housing;
a first container defining a bore therethrough;
a first container cap defining a first container cap internal cavity, and including a first container cap open end in communication with the first container cap internal cavity, and a flanged closed end, the first container cap open end being receivable in a first end of the bore; and a first container end cap including a first end and a flanged second end, the first end being receivable through a second end of the bore and in the first container cap open end.

14. The retractable leash system as claimed in claim 13 further comprising a second container defining a second container internal cavity and a second container open end, and including a second container cap configured to be securable to the second container open end.

15. The retractable leash system as claimed in claim 14, wherein the second container cap includes a post extending from a first side of the second container cap, the post includes threading engageable with threading of a recess defined in the flanged closed end of the first container cap or threading of a recess defined in the flanged second end of the first container end cap.

16. The retractable leash system as claimed in claim 14 further comprising a ball thrower including a first end and a ball receiving end, the first end of the ball thrower including threading configured to engage with threading of the second container open end when the second container cap is removed from the second container open end.

17. The retractable leash system as claimed in claim 14 further comprising a third container, the third container defining a third container internal cavity and a third container open end, and including a third container cap securable to the third container open end.

18. The retractable leash system as claimed in claim 13, wherein the flanged closed end of the first container cap has a width or diameter larger than a width or diameter of the bore, and the flanged second end of the first container end cap has a width or diameter larger than the width or diameter of the bore.

19. The retractable leash system as claimed in claim 18, wherein the flanged closed end of the first container cap being associated with a first seal, and the flanged second end of the first container end cap being associated with a second seal, and wherein the first seal being configured to contact a first side of the first container and the second seal being configured to contact a second side of the first container when the first container cap and the first container end cap are assembled in the bore.

20. A retractable leash system comprising:
a housing including a leash retracting mechanism configured to provide retraction of a leash extending out of the housing;
a first container defining a bore therethrough;
a first container cap defining a first container cap internal cavity, and including a first container cap open end in communication with the first container cap internal cavity, and a flanged closed end, the first container cap open end being receivable in a first end of the bore;
a first container end cap including a first end and a flanged second end, the first end being receivable through a second end of the bore and receivable in the first container cap open end;
a second container defining a second container internal cavity and a second container open end;
a second container cap configured to be securable to the second container open end in an in-use position and securable to a recess defined in the first container cap or the first container end cap when in a stored position;
a third container defining a third container internal cavity and a third container open end, and including a third container cap securable to the third container open end; and a ball thrower including a first end and a ball receiving end, the first end of the ball thrower being securable to the second container open end when the second container cap is removed from the second container open end.

* * * * *